United States Patent
Nurminen et al.

(10) Patent No.: US 8,554,784 B2
(45) Date of Patent: Oct. 8, 2013

(54) DISCOVERING PEER-TO-PEER CONTENT USING METADATA STREAMS

(75) Inventors: Jukka Kalevi Nurminen, Espoo (FI); Olli Johannes Karonen, Helsinki (FI); Heikki Juiiani Kokkinen, Helsinki (FI)

(73) Assignee: Nokia Corporation, Espoo (FI)

( * ) Notice: Subject to any disclaimer, the term of this patent is extended or adjusted under 35 U.S.C. 154(b) by 588 days.

(21) Appl. No.: 11/897,679

(22) Filed: Aug. 31, 2007

(65) Prior Publication Data
US 2009/0063419 A1 Mar. 5, 2009

(51) Int. Cl.
*G06F 17/30* (2006.01)

(52) U.S. Cl.
USPC ............. 707/769; 707/708; 707/999.201; 707/E17.032

(58) Field of Classification Search
USPC ............................................. 707/708
See application file for complete search history.

(56) References Cited

U.S. PATENT DOCUMENTS

| | | | |
|---|---|---|---|
| 2004/0111465 | A1 | 6/2004 | Chuang et al. |
| 2004/0201684 | A1* | 10/2004 | Janson, Jr. ............. 348/207.1 |
| 2005/0131871 | A1* | 6/2005 | Howard et al. ............... 707/3 |
| 2006/0212899 | A1 | 9/2006 | Steelberg et al. |
| 2006/0251384 | A1 | 11/2006 | Vronay et al. |
| 2007/0198744 | A1* | 8/2007 | Wensley et al. ............ 709/248 |

FOREIGN PATENT DOCUMENTS

| | | |
|---|---|---|
| CN | 1788259 A | 6/2006 |
| WO | WO 03/030034 | 4/2003 |
| WO | WO 03/030034 A1 | 4/2003 |
| WO | WO 2005/119515 | 12/2005 |

OTHER PUBLICATIONS

Yu et al., "Automatic Video Production with User Customization", Multimedia Computing and Networking, 2005, pp. 203-215.

ComVu PocketCaster™, Product Sheet, Broadcast life from the palm of your hand, http://www.comvu.com, 1 page, printed from internet Jul. 24, 2007.

Davis et al., "MMM2: Mobile Media Metadata for Media Sharing", University of California Berkeley School of Information Management and Systems, 4 pages, Apr. 2-7, 2005.

Garage Cinema Research Group, School of Information, University of California at Berkeley, http://209.85.173.104/search?q=cache:FEorY17o_ylJ:garage.sims.berkeley, 4 pages, printed from internet Mar. 28, 2008.

Joost from Wikipedia, Revision as edited by Secretlondon (Talk contribs) Aug. 15, 2007, http://en.wikipedia.org/w/index.php?title=Joost&oldid=151351984, 4 pages, printed from internet Mar. 28, 2008.

Mobile Applications BOF: Oct. 28, 2004, The San Francisco Bay Area Chapter of ACM SIGCHI, http://www.baychi.org/bof/mobile/20041028, 2 pages, printed from internet Mar. 28, 2008.

(Continued)

*Primary Examiner* — Anteneh Girma
(74) *Attorney, Agent, or Firm* — Ditthavong Mori & Steiner, P.C.

(57) ABSTRACT

Discovering peer-to-peer content using metadata streams involves capturing, for each of a plurality of devices, a content and metadata stream that describes a context of the content. The metadata streams are sent to a metadata repository contemporaneously with the capture of the content by the respective devices. Network queries of the streaming metadata are enabled via the metadata repository, and, in response to the network queries, peer-to-peer access of the content is facilitated from one or more of the devices.

23 Claims, 13 Drawing Sheets

(56) References Cited

OTHER PUBLICATIONS

Muveeshow, Shoot it. muvee it. Show it. Instant photo-movies on your phone.2 pages, Aug. 29, 2007.

Page et al., "Continuous Metadata", Intelligence, Agents, Multimedia, Department of Electronics and Computer Science, University of Southampton, UK, 6 pages, 2001.

Page et al., "Its About Time: Link Streams as Continuous Metadata", Intelligence, Agents, Multimedia, Department of Electronics and Computer Science, University of Southampton, UK, 10 pages, 2001.

PressPass—Information for Journalists, http://www.microsoft.com/presspass/features/2004/feb04/02-02media, 4 pages, Mar. 28, 2008.

B. Yu et al., "AVPUC: Automatic Video Production with User Customization", Department of Computer Science, University of Illinois at Urbana-Champaign, pp. 1-13.

Office Action for related Chinese Patent Application No. 200880108342.8 dated Aug. 21, 2012, pp. 1-9.

Office Action for related Canadian Patent Application No. 2 696 717 dated Jul. 4, 2012, pp. 1-5.

\* cited by examiner

DISCOVERING PEER-TO-PEER CONTENT USING METADATA STREAMS

FIELD OF THE INVENTION

This invention relates in general to accessing mobile device content via networks, and more particularly to discovering peer-to-peer content using metadata streams.

BACKGROUND OF THE INVENTION

Internet sites such as YouTube have found a way for content creators to reach new audiences. Similarly, these social networks provide audiences with easy access to a rich variety of content that would previously have been difficult to access, or would have relied on distribution by traditional media outlets. Members of the YouTube community capture video content from a multitude of sources and upload the video to a YouTube server along with a description/categorization of the content, and the video is converted to a common format. The content can be discovered through a search engine, and be linked to other content. The users themselves decide what to post and what to view, and the interventions made by YouTube are typically only to remove offensive or copyrighted material. Other than that, the content seen in a social networking site such as YouTube is created and selected by the participants.

With the increase of mobile devices capable of producing multimedia especially videos, it is likely that the amount of user created video content will explode. Mobile terminals have already provided important and useful news event footage taken by ordinary users. For example, in the Indian Ocean tsunami of 2004 and the terrorist bombings in London in 2005, mobile cameras provided images of events taken by regular people caught up in the events. Such images were taken as the events occurred, and were made quickly available for viewing via the Internet.

Dramatic events like these highlight the ubiquity of cell phone cameras and how they can be used for news gathering. Even without a newsworthy event going on, though, individuals may still routinely document seemingly ordinary and mundane occurrences using their mobile technology. For the most part, this content is only of interest to the person who captured it, and even then it may be seen as disposable on later review by the same person who captured the content. Nonetheless, even a picture or video of an ordinary street scene may have value to certain persons under certain circumstances.

The typical content sharing scenario involves a user creating an image, uploading it to a site, and attaching some description with the image. However this sequence of actions may become difficult to manage for a mobile device user. Using existing content sharing paradigms, the user will wait until they arrive home, access the media, and if the media is interesting, upload the media to a file sharing site via a personal computer. There are disadvantages to this approach. For example, some content data is useful due to its immediate relevancy, and quickly becomes stale. For example if a person wanted to "peek" into their favorite pub to see if it was crowded, a video or picture taken in that pub within the last ten minutes or so would be quite useful, even if the picture is of poor quality. However, a picture taken in the same pub the day before, no matter how well composed, would have little relevance for this particular purpose.

In other situations, users may not even consider the content useful enough to bother uploading or sharing it. For example, a video clip of a concert may have been marred by an obstruction that blocked the camera view during much of the video. However, unbeknownst to the user, the video may have caught an unrelated event that is far more valuable than the concert footage (e.g., smoke trail in the sky from a crashing plane, a famous person in the crowd, etc.). Anyone who might be interested in something that occurred at a certain place and a certain time may desire to know if anybody there was making some sort of record of the event, even if the record otherwise seems worthless. Therefore, an easier way is needed to manage the various aspects of gathering, classifying, and managing content streams in the mobile environment.

SUMMARY OF THE INVENTION

To overcome limitations in the prior art described above, and to overcome other limitations that will become apparent upon reading and understanding the present specification, the present invention discloses a system, apparatus and method for discovering peer-to-peer content using metadata streams. In accordance with one embodiment of the invention, a method involves capturing, for each of a plurality of mobile devices, content and a metadata stream that describes a context of the content. The metadata streams are sent to a metadata repository contemporaneously with the capture of the content by the respective mobile devices. Network queries of the streaming metadata are enabled via the metadata repository. In response to the network queries, peer-to-peer access of the content from one or more of the mobile devices is facilitated.

In more particular embodiments, enabling network queries of the streaming metadata via the metadata repository involves compiling two or more of the metadata streams into a composite event, such that each of the two or more streams of the metadata includes a channel of the composite event. In such a case, metadata is provided that describes the composite event in response to the network query. The two or more streams are automatically for compilation via a computing arrangement based on predetermined criteria of the metadata streams. The predetermined criteria may include additional metadata gathered from the two or more devices, such that the additional metadata describes a measured characteristic of the content captured by the respective devices. The predetermined criteria may alternately or in additionally include a popularity of at least one of the metadata stream and the content associated with the metadata stream.

In the particular embodiment of the method where two or more of the metadata streams are compiled into a composite event, the method may also involve facilitating selecting the two or more streams for compilation via a human director who is independent of the devices and of viewers of the content. The human director may be provided additional metadata gathered from the two or more devices, wherein the additional metadata describes a composition of the respective content captured by the devices. In such a case, the additional metadata may include a low bandwidth representation of the respective content.

In the particular embodiment of the method where two or more of the metadata streams are compiled into a composite event, the method may involve facilitating user selection of the channels by a user who views the content associated with the composite event via the peer-to-peer access. In another variation of this particular embodiment, the method may involve facilitating user access to the two or more streams of metadata, and facilitating user modification of the composite event based on user access to the two or more streams of metadata.

In other more particular embodiments, enabling network queries of the streaming metadata via the metadata repository may involve enabling queries based on location, time, and popularity of the content associated with the metadata. The method may further involve sending a signal via the metadata repository to at least one of the plurality of devices. The signal indicates a desire to capture specific content, and the at least one device captures the specific content in response to the signal. In other variations, the method may further involve detecting, by at least one of plurality of devices, data from a proximate device. In such a case, the at least one device sends the data of the proximate device to the network service as part of the metadata stream captured by the at least one device.

In another embodiment of the invention, an apparatus includes a network interface capable of connecting to a network and a sensor capable of gathering media content. A processor is coupled to the sensor and the network interface, and memory is coupled to the processor. The memory has instructions that cause the processor to capture content via the sensor, generate a metadata stream that describes a context of the content, send the metadata stream to a metadata repository contemporaneously with the capture of the content. The instructions further cause the processor to facilitate, in response to the network queries processed by the metadata repository, peer-to-peer access of the content from the apparatus.

In more particular embodiments, the apparatus includes a metadata sensor coupled to the processor, and in such a case the instructions further cause the processor to generate the metadata based on readings of the metadata sensor. In other variations, the instructions further cause the processor to: send, to the metadata repository, a network query based on the generated metadata stream; access, via the metadata repository, other metadata contributed by peer devices in response to the query, wherein the other metadata is related to the generated metadata stream; and access content of the peer devices that are associated with the other metadata. In another variation, the instructions further cause the processor to detect data from one or more proximate devices and generate at least part of the metadata stream from the data of the proximate devices.

In another embodiment of the invention, a computer-readable storage medium has instructions executable by a processor of a device for performing steps that include: capturing content via a sensor of the device; generating a metadata stream that describes a context of the content; sending the metadata stream to a metadata repository contemporaneously with the capture of the content; and facilitating, in response to the network queries processed by the metadata repository, peer-to-peer access of the content from one or more of the devices.

In another embodiment of the invention, an apparatus includes a network interface capable of connecting to a network and a data storage device storing a database. A processor is coupled to the data storage device and the network interface, and memory is coupled to the processor. The memory has instructions that cause the processor to receive metadata streams from content creation devices. The content creation devices generate the metadata contemporaneously with the capture of the content by the respective content creation devices. The instructions further cause the processor to store metadata derived from the metadata streams in the database, receive network queries from a content consumer device, and form a response to the query based on the metadata contained in the database. The response contains data that facilitates peer-to-peer access of the content from the content creation devices. The apparatus sends the response to the content consumer device via the network.

In a more particular embodiment of the apparatus, the instructions further cause the processor to compile two or more streams of metadata into a composite event. Each of the two or more streams of the metadata includes a channel of the composite event. The composite event is provided in response to the network query. In such a case, the instructions may further cause the processor to facilitate selecting the two or more streams for compilation via a human director who is independent of the content creation devices and the content consumer device. In another variations, the instructions may further cause the processor to automatically select the two or more streams for compilation based on additional metadata of content creation devices. The additional metadata describes a measurement of the content captured by the respective devices.

In another embodiment of the invention, a computer-readable storage medium has instructions executable by a processor of a server for performing steps that include: receiving metadata streams from content creation devices. The content creation devices generate the metadata contemporaneously with the capture of the content by the respective content creation devices. The instructions are further executable by the processor to: store metadata derived from the metadata streams in a database; receive network queries from a content consumer device; form a response to the query based on the metadata contained in the database; and send the response to the content consumer device via the network. The response contains data that facilitates peer-to-peer access of the content from the content creation devices. The steps optionally include compiling two or more streams of metadata into a composite event, and providing the composite event in response to the network query. In such a case, each of the two or more streams of the metadata may include a channel of the composite event.

In another embodiment of the invention, a system includes a plurality of mobile devices coupled via a network. Each of the mobile devices includes means for capturing content; means for capturing metadata that describes a context of the content; means for streaming the metadata via the network contemporaneously with the capture of the content; and means for providing access to the captured content using a peer-to-peer data transfer. The system includes a content consumer device coupled to the network. The content consumer device includes means for forming a query for the content based on the metadata; means for sending the query via the network; and means for accessing the content from one or more of the mobile devices via the peer-to-peer data transfer. The system further includes a metadata repository that has means for receiving and storing the streaming metadata from the mobile devices; means for receiving the query from the content consumer device; means for determining stored metadata that satisfies the query; and means for forming a response to the query based on the stored metadata that satisfies the query. The response includes data allowing the content consumer device to access of the content from the one or more of the mobile devices via the peer-to-peer data transfer These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of systems, apparatuses, and methods in accordance with the invention.

BRIEF DESCRIPTION OF THE DRAWINGS

The invention is described in connection with the embodiments illustrated in the following diagrams.

DETAILED DESCRIPTION OF EMBODIMENTS OF THE INVENTION

Figure 1:
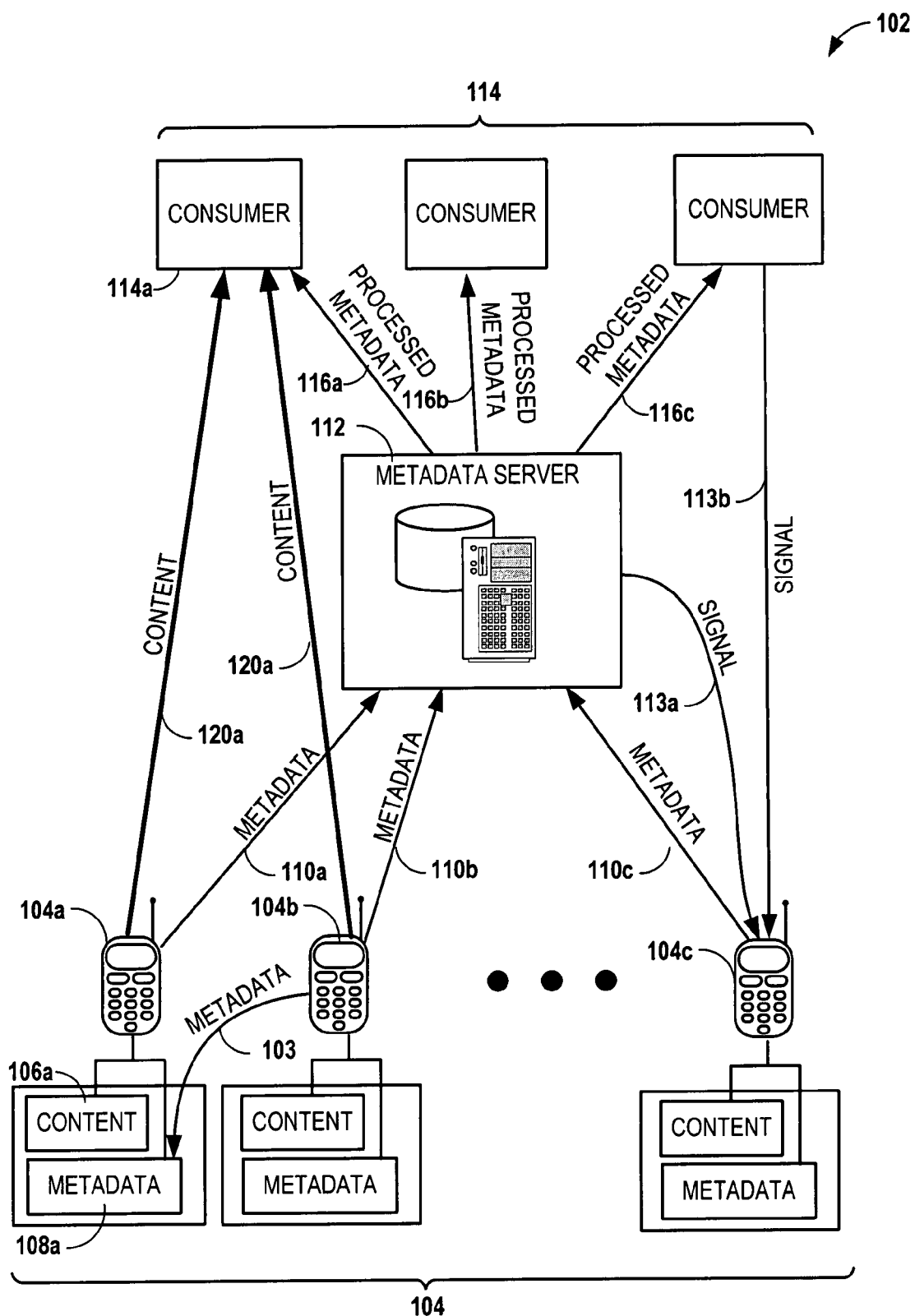
FIG. 1 is a block diagram illustrating a system according to embodiments of the invention.

In the following description of various exemplary embodiments, reference is made to the accompanying drawings that form a part hereof, and in which is shown by way of illustration various embodiments in which the invention may be practiced. It is to be understood that other embodiments may be utilized, as structural and operational changes may be made without departing from the scope of the present invention.

Generally, the present invention is directed to discovering peer-to-peer content created from mobile devices using metadata streams. As described in greater detail below, the content may include video, but the concepts relating to the invention may be equally applicable to other media such as voice recordings, still photos, biometric data, sensor data, etc. The content may be in any format, including file downloads or streams. Generally, terms such as "content," "videos," "video clips," etc. may refer to both content that is ultimately provided in file and/or streaming formats. This content may be shared by the person who created it, and this sharing may occur in real-time or near-real time. An increasingly common example of this can be seen in video sharing communities such as YouTube. While current video sharing communities facilitate sharing stored videos, sharing of live, user-created, video streams will be increasingly important in the future. As the video capabilities of phones improves, tariffs decrease (e.g., transitions to flat rate fees), and phones have more ubiquitous wideband access, the number of such video streams that people are creating is likely to be high.

As the devices able to create and share media streams continue to proliferate, several problems arise. Creating, delivering and consuming user-created live content involves many challenges. For example, such devices will typically store such media on the device itself, at least for the short term. Therefore, this makes it difficult for a content consumer to discover that some real-time or near-real-time content is relevant and available. One advantage of mobile created content is that it is ubiquitous, so the possibility of finding a particular piece of content that conforms to some criteria (e.g., taken at a particular place and time) increases as this type of content capture becomes more common. The criterion for locating such content is virtually limitless, however, so search for particular content becomes difficult.

Certain content, such as video clips, are typically very short, so the reaction times are very short for content creators, content consumers and mediators between the two. For example, a number of people at a particular location at a particular time might be willing to use personal mobile devices to capture some content of interest. However, without some indications that such content is desired, there is little motivation to capture images/media at random. Similarly, a content consumer may have ways of determining certain events of interest at any time, such as by a fixed webcam or the like, but has no way to remotely indicate to others of this event. Such a remote indication may be useful to capture better images, better angles, and other features such as sound and accurate location measurements.

The opportunities to create ad-hoc content may appear and disappear very suddenly, and there can be long intervals when there is no interesting content at all, and then perhaps even too much at the same time. In typical content creation scenarios, the content is rather short duration, as well as being short-lived (e.g., creators have tendency to delete much content to save storage space). Thus there is an overall churn in delivery, content and consumption. In the event that the creator of the content wishes to share particular content, it must be easy for the content creator to make such content fast and easily available.

In various embodiments of the invention, a user can capture mobile metadata, use it to find similar images, and make educated guesses about the recently captured content by using the metadata of related content. For example, a user who sees an interesting landmark with no description may be able to determine their current location, and based on metadata associated with content viewable at that location, determine more information about that landmark. In other cases, the metadata may be used to make photo sharing easier. The metadata may capture spatial context (e.g., using CellID, Bluetooth-enabled GPS devices, fixed location Bluetooth objects such as PCs), temporal context (e.g., network time servers), and social context (e.g., who is co-present determined by the association of sensed mobile Bluetooth devices and user names). In these cases, the metadata is highly dynamic and automatically generated when the stream is captured. Such metadata streams may be used to select which of a multitude of video streams the viewer should see. Metadata may contain items like shot direction, samples of primary data with lower resolutions and lower frequency, time of day, etc.

Various embodiments of the present invention may use a combination of live metadata streams, dynamic and predefined channels, personal and mediator-level stream prioritization, and selection to allow efficient content publishing, delivery and consumption. There can be dedicated predefined channels for different categories of user-created content (e.g., 1st of May, Paris/Bagdad Today, Hawaii Sailing Regatta) and the creator can choose the most suitable channel for his/her stream. In one arrangement, a new ad-hoc channel (e.g. Makasiinien palo) can be created by a moderator, broadcasted (e.g. by SMS) to the candidate creators in the proximity of the event, and pull-type of fashion gather additional content from nearby participants. Just the metadata streams of the channel may be sent to the moderator or to the consumers of the channel, to save bandwidth, to get a broader view of several sources/streams and to support selection of the streams to be shown. The metadata streams may be selected individually for each consumer of the channel or by the moderator to offer a good default selection.

The metadata may include time, location, orientation, social context, and user defined labels/keywords that describe the context of the associated media. Other metadata may also be used that describes the content itself, such as audio/video signal level, dynamic changes in signals, and other measurements that may be used to provide an indication of useful content. For example, analyzing/measuring the metadata streams (e.g. finding the audio volume peaks in a soccer channel) allows automatic selection of a stream where most likely something interesting is happening. In cases where the metadata streams include condensed representations of the actual streams, the user can also manually surf the metadata steams one by one, use a mosaic view of several metadata streams, or use a single view where metadata from several streams is integrated together.

Even semi-predefined or moderator-supported dynamic channels create more structure and synchronization to the ecosystem, so that P2P streaming technologies can be exploited more efficiently. For example, where each device of a plurality of users may be used to record an event of interest, the media from each of those devices may be compiled into a composite event. Each user's stream, if and when available, may be presented as a channel of the composite event. In such a situation, the viewing experience may involve the seamless jumping from one channel to another. Jumping between channels can be controlled by the user (next/previous substream similar to TV channel switching) or it can be automatic.

In channel switching situations, it may take a while before a new substream is loaded to the viewing device. It is preferable to avoid the user having to stare at an empty screen when switching between substreams. One way to prevent this is "preheating," which involves background transfers of the beginnings (or other limited representations) of the neighboring streams to the phone. Thus when the user chooses next/previous channel they are already available to some extent in the viewing device. In another implementation, advertisements could be shown during stream changes. For example, the system may download in the background a suitable advertisement clip (matching the content, user preferences, context, etc.) and display the advertisement clip while the system sets up the transmission of the selected substream.

The metadata stream typically includes static and dynamic data inserted from the originating device. However, it can also contain data created by other members of the community. As previously mentioned, identifiers of nearby users/devices may provide a useful context for captured content. In another case, the metadata stream can contain information provided by the dynamically changing viewer population. For example, when automatically selecting from the streams to create a composite, the popularity of individual streams could be an important parameter, as well as information about what others are currently viewing. Likewise, the stream could contain bookmarks added by viewers, ratings, etc. Such information could also be interesting for the shooter and act as an incentive to keep on shooting.

It may be unlikely that live streaming content is always available, and in such a case the system could also use stored video clips to fill in at those times when nothing is happening. It could for instance display a collection of the most popular streams of the past few hours. For the efficiency of the P2P delivery system (via techniques like CoolStreaming) it may be desirable to have a large number of users viewing exactly the same content. Therefore the automatic mixing feature of the solution may be designed to create (by using the metadata) such a combination of streams that would satisfy most viewers. A user can override the automatically made stream selections, in which case the user would be able to view his personally chosen streams. It could also be possible to consider the load situation of the separate substreams and only allow manual selection if there is enough streaming capacity available in the network.

In reference now to FIG. 1, a block diagram illustrates a system 102 according to an embodiment of the invention. Generally, a plurality of mobile devices 104 are capable of generating content and metadata related to that content. For example, mobile device 104a includes a content generating module 106a and a metadata generating module 108a. These modules 106a, 108a, may tie into various sensors and other data sources either included on the device 104a or accessible via the device 104a. For example, metadata 103 is collected by device 104a from proximate device 104b, and this metadata 103 may be included with metadata locally generated via module 108a. The devices 104 capture the metadata contemporaneously with the capture/creation of the associated content (e.g. a photo or video), and the metadata is streamed 110a-c to a metadata repository server 112.

The devices 104 are configured to at least stream metadata for some period of time, as indicated by metadata streams 110a-c originating from terminals 104a-c, respectively. Metadata 110a-c may be sent using an explicit publishing command, or the user can choose it to happen automatically once content capture has started, finished, or any time in between. The content captured by the devices 104 may remain on the devices 104 and may be set as private to the user. Depending on the user's preference the metadata may be stored on the server 112 anonymously or it may allow linking the metadata back to the user. In some business models, the metadata could be free but it would cost to access the actual content.

A further possibility is that an entity (e.g., a news provider) may send invitations, offering a publishing channel to users around a place where something interesting is happening (potentially with some financial incentive). This is shown as signals 113a-b, which are sent to device 104c requesting that the device 104c capture content according to known capabilities of the device 104c. Signal 113a originates from metadata server 112 and signal 113b originates directly from a content consumer device 114. Signals 113a-b may use custom channels/protocols associated with a metadata streaming system 102, or may use other mechanisms (e.g., text messaging, email, phone calls, special ringtone signaling, etc.) and may include data that specifies exactly what is requested. In order for the originators of the signals 113a-b to know relevant destinations for their requests, device 104c may send metadata even when no content is being captured. In such a case, targeted requests for content can be sent to potential contributors who are in the right place at the right time, but may not be recording anything at the moment.

The metadata streams 110a-c are typically carried to the metadata repository server 112 by way of a wireless digital network, although other transmission media and architectures may be used. In general, the metadata streams 110a-c are repeatedly updated data transmissions that describes content that either is currently being captured by the respective devices 104a-c, or content that could be captured by the devices 104a-c should the device owners decide to do so. The time interval between repeated transmissions of metadata 100a-c may be dependent on the type of content to which the metadata is associated, current state/condition of the terminal, network bandwidth, or other factors. For example, if the content module 106a is generating video while the device 104a is in motion and the metadata module 108a is capturing location associated with the video, then an update of metadata sent via the stream 110a may be dependent on the speed that the device 104a is currently moving. When the device 104a is stationary, there may still be some minimal rate of metadata update (e.g., a heartbeat indicator).

The metadata streams 110a-c are received and processed by the metadata server 112. Generally, the metadata server 112 collects metadata from mobile content creators 104, compiles, classifies and/or correlates the metadata, and makes processed metadata 116a-c available to content consumers 114. The metadata server 112 may also contact the peers 104 listed in the metadata to find out which video clips/streams are on-line at any given point of time and what the estimated access speed to them is. As a result the system 112 knows which video it is able to access and what are their metadata properties (time, duration, shooting location, shooting target location, popularity, etc.). The video is typically provided in the form of a stream (e.g., a continuous stream of bits that are intended for near real-time viewing) as opposed to a file (e.g., a predefined data object that is usually intended for complete download before being viewed). The embodiments of the invention may be capable of providing downloadable files, although where the content creation and viewership requests are highly dynamic and variable, streaming the content may be more efficient on the content creation side, as well as providing more immediate results to viewers.

Although FIG. 1 shows the metadata server 112 as a centralized entity, it is also possible to implement the server 112 in a distributed, peer-to-peer fashion. In some instances, it may be desirable to have some functionality of the metadata server 112 exist on a mobile network with some or all of the content creating devices 106, while having other components that interface with consumers 114 exist on fixed infrastructure networks such as the Internet. In other cases, it may be desirable for the creation devices 104 themselves respond to distributed search queries, such as used by peer-to-peer file sharing technologies as Gnutella and Kazaa. Instead of searching for file names, however, the devices 104 would respond to queries directed to time, location, subject-matter, and other metadata.

The metadata server 112 may allow content consumers 114 to find content in various ways. For example, the viewers may submit a query to the server 112 outlining various criteria, such as place, time, view angle, event name, event category, etc. In response to the query, the server 112 could return processed metadata 116a-c that allows the viewers 114 to access content that satisfies the query. This processed metadata 116a-c may include historical summary data compiled from metadata 110a-c. In addition or in the alternate, the processed metadata 116a-c may include a composite stream formed the metadata 110a-c and delivered in real-time, as the devices 104a-c are producing the metadata 110a-c and associated content.

As used herein, the terms "real-time" or "near real-time" may include at least data updates and latencies sufficient for their intended purposes, and/or responses that are sufficiently fast and timely to satisfy expectations of the end user. For example, a traffic camera that updates every five minutes may be considered "real-time" for purpose of monitoring traffic congestion, but may not be considered "real-time" for purposes of estimating the speed of a passing car. Compare this to a traffic camera with a frame rate of ten times per second but with a two-hour latency in making the data available. In the latter case, the data may be considered "real-time" for purposes of estimating a vehicle's speed if the desired responsive action, such as issuing a speeding ticket, is not sensitive to the latency. However, in the latter example the traffic camera might not be considered real-time for determining congestion, because traffic conditions can vary significantly over a two hour period.

An example of a processed metadata stream 116a-c that is provided in real-time is where the server 112 streams (using any streaming technique) a "metadata channel" that the client 114 could watch like a normal TV channel. This metadata channel could access one or more of the original metadata streams 110a-b (or approximations thereof) at a time. For example, where the metadata streams 110a-c include a representation of the associated content (e.g., in a low-bandwidth format), the processed metadata 116a-c may include a composite rendering of multiple streams, such as a mosaic picture for video or photographic content. The consumer 114 could use these processed metadata channels/views as a dynamic TV guide and instantly move to watch any of the content streams provided from the mobile devices 104.

In another example of how the metadata server 112 can respond to searches, the server 112 could provide a map or similar GUI that enables the selection of a particular area. A map or the selected area may be presented that shows icons indicating where the people (or devices) that are providing content are located, what type of content they are providing (e.g., sound, video), what direction they are shooting at, zoom level, resolution, content samples, available bandwidth, latencies, and other data regarding the user, the user device, network infrastructure, and the expected content. Clicking a certain icon may allow jumping to the video stream coming from the person/device that the icon represents.

Figure 2:
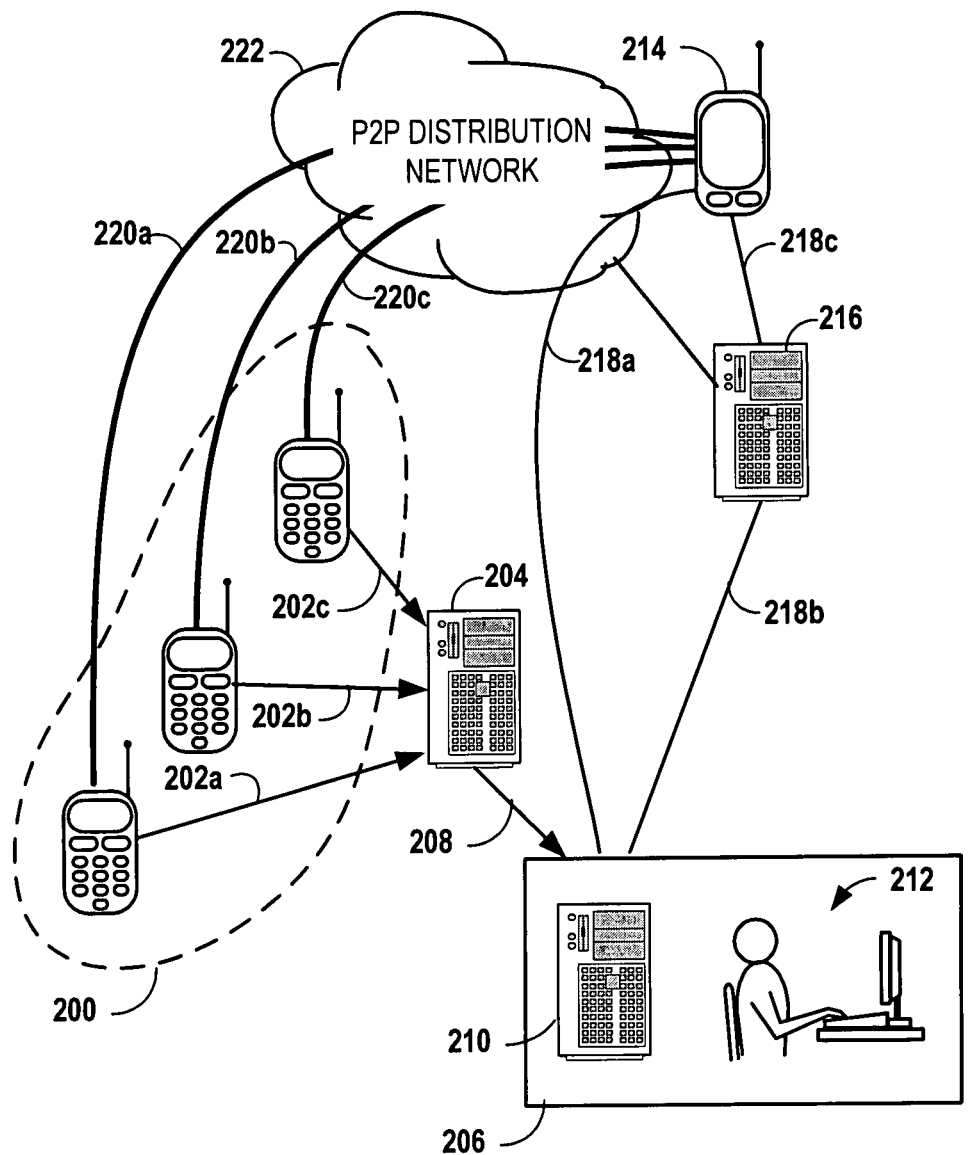
FIG. 2 is a block diagram illustrating automatic pre-processing of metadata streams by a system according to an embodiment of the invention according to an embodiment of the invention.

In reference now to FIG. 2, a block diagram illustrates details of automatic pre-processing of metadata streams by a system according to an embodiment of the invention. Generally, content creation terminal devices 200 stream metadata 202a-c to a metadata repository 204. A director service 206 analyzes some or all of the metadata, as indicated by path 208. The director service 206 may use any combination of automatic, algorithmic analysis of the metadata 208 (as represented by processor 210) or by human analysis (as represented by operator station 212). The director service 206 can analyze the incoming metadata 208 and decide the composition of a combined stream that can be received by viewers, as represented by viewing terminal 214.

The director service 206 uses the criteria specified by the requesting users to compose the combined stream. This may be viewed as a multi-criteria optimization problem where the combination of match accuracy, popularity, accessibility, etc., are taken into account. The access speed can be one criterion in deciding the ordering of the clips. The composition of the combined stream, as determined by the director service 206, is sent as instructions 218a-b to the viewing terminal 214 and/or an intermediate server 216. The intermediate server 216 may simply forward the instructions 218b, or provide caching, processing, transformation, localization, and other operations on the data 218b before sending instructions 218c to the viewing device 214. The viewing device 214 uses the received instructions 218a,c to access content streams 220a-c from the creator devices 200 via a peer-to-peer (P2P) distribution network 222, although other networking distribution architectures beside P2P may be used instead of or in addition to P2P. Generally, this may involve a direct device-to-device transfer of the content streams 220a-c, however intermediary network elements may be used to make the content transfer more efficient.

For example, the intermediary server 216 may be able to read the incoming and outgoing instruction streams 218b-c and determine that the server 216 knows of cached content for similar instructions sent to other devices, in which case the instructions may be altered to direct the viewer 214 to download some part of the content elsewhere than from the originating device 200. Similarly, where the server 216 detects a plurality of viewers trying to access the same content channel/stream, the server 216 may proxy the content on behalf of the creator device 200. In such a case, the creator device 200 only need to deliver the content to one device, the server 216, and the server 216 can handle the distribution to multiple viewers.

Other P2P technologies may also be used to more efficiently transport content without involving a centralized server 216. For example a technology such as Bittorrent can allow multiple devices to simultaneously transmit part of a file download, and thus relieve bandwidth constraint on the originator of the download. Although Bittorrent is adapted to facilitate downloads of individual files, it may be possible to extend this technology to transmission of streams. For example, streams could be separated into substreams, and each substream is transmitted from a different peer 200. The substreams are then assembled into a single viewable media stream at the destination 214. Other technologies, such as network broadcast and multicast may also be used under some conditions to facilitate more efficient content transport. When enough of the material has been received, the device 214 starts rendering the media to the user. Downloading of clips that may be needed later in the experience can still continue in the background concurrently with the rendering. While viewing the content, the user can modify preferences and the streamed content would be adjusted accordingly.

Figure 3A:
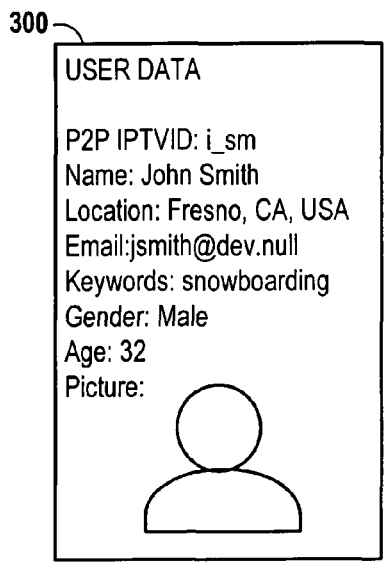
FIGS. 3A-D are diagrams illustrating graphical user interfaces according to embodiments of the invention.
Figure 3B:
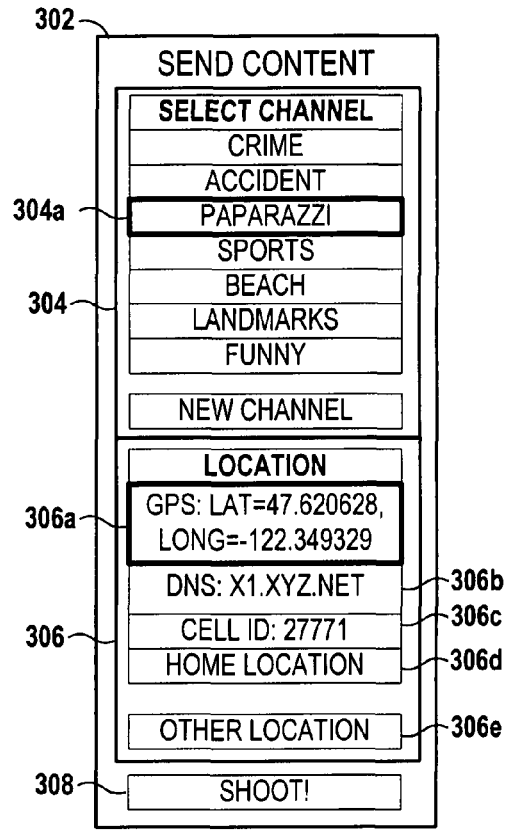

In reference now to FIGS. 3A-D, various user interface screens illustrate a use case according to an embodiment of the invention. In FIG. 3A, a screen 300 illustrates data that may be filled in by the user of the content creation device. This data 300 may be included with metadata streams. In FIG. 3B, a screen 302 illustrates an example interface that might be seen by the user of the content creation device. The screen 302 includes channel selection controls 304, location definition controls 306, and an activation control 308. Both the channel selection controls 304 and location definition controls 306 can be used to set criteria for metadata streams being sent from the device.

Each time the user begins to stream content from the device, the user selects the channel (e.g., channel 304a) and location (e.g., via GPS selection 306a). Location criteria may be described by GPS location 306a, domain name server (DNS) location 306b (or other fixed network service entity, such as gateways and proxies), a wireless base station identifier 306c (or other wireless infrastructure, such as a wireless local area network access point), user's home location 306d, or other 306e. Both the data describing selected channel 304a and data describing the selected location criteria 306a can be streamed by the device and used by others to find and view the particular content created by this user.

Figure 3C:
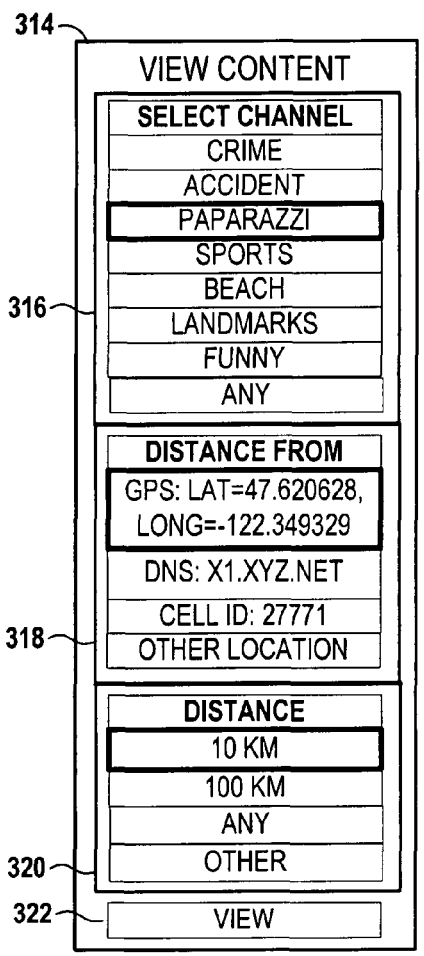
Figure 3D:
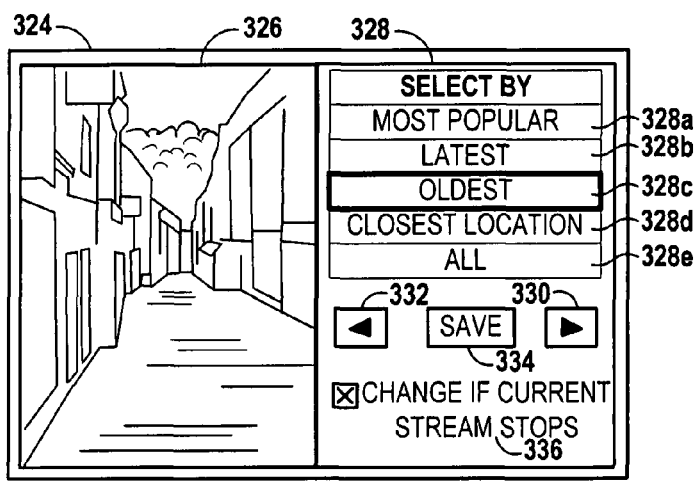

In FIG. 3C, a screen 314 illustrates a user interface that might be seen by a prospective viewer of the content. The screen provides controls for selecting metadata criteria, including content channel controls 316, and location controls 318, 320. These controls result in a query for metadata streams being sent to a centralized or distributed metadata repository, and assuming content is found that matches the criteria, the viewer may access the content using control 322. FIG. 3D shows an example content viewing screen 324 that may be displayed in response to selection of control 322 in screen 314.

In the content viewing screen 324, a rendering section 326 presents the streaming content for a current content stream. In this example, the rendered content is video or other imagery, but other user created media may also be rendered with or without a separate rendering area (e.g., sound, vector graphics). It will be appreciated that the rendering section 326 may also present metadata from multiple metadata streams, and allow the user to select one of those streams to view the associated content (e.g., user clicks on a square in a mosaic to select). The content viewing screen 324 may also contain selection controls 328 that enable the selection of the current stream by criteria such as popularity 328a, latest 328b, oldest 328c, closest location 328d, and all 328e. Other stream controls may also be used to change one or more of stream/channel selection and or playback of the content. For example, next control 330 and previous control 332 may allow browsing between streams, assuming multiple available streams satisfy the current selection criteria 328a-e. A capture control 334 allows saving the currently displayed content to persistent memory, and a selection control 336 allows for automatic switching of controls if the current stream stops.

As the content viewing screen 324 indicates, the viewing of multiple streams/substreams may involve the jumping from one stream to another, such as manually via controls 328a-e, 330, 332, or automatically such as via control 336. One issue with switching streams in this way is that it may take a while before the new stream is loaded to the rendering device. To avoid blackouts or pauses when switching between streams, some neighboring streams may be preloaded. For example when the user is watching a particular stream, a portion of the neighboring streams are transferred to the device in the background. Thus when the user chooses next/previous channel, they are already available in the phone. In another arrangement, the system could download a suitable advertisement clip in the background (matching the content, user preferences, context etc.) and display the advertisement clip while the system sets up the transmission of a newly selected substream. In another arrangement, the system could use stored video clips to fill in pauses between stream transitions, and also at those times when nothing is happening in any of the streams. It could for instance display a collection of the most popular streams of the past few hours.

Many other features may be included in a content viewing interface such as screen 324. The screen may provide typical playback controls such as fast forward, rewind, pause, etc., to control the a single channel or stream. However, because of the existence of multiple channels, new possibilities may be made available by allowing the user to also view the metadata associated with the content. For example, a metadata display may show text, graphs, images and other data that represents context or descriptions of the associated content creation devices. The metadata display may be shown concurrently with the content 326, or have its own dedicated display. The user may be able to lock the display 326 to a single content creation device and thereby override the prepared composition. In other arrangements, the user can store and/or modify the prepared composition, for example by asking to see videos showing a certain location he finds interesting. The user interface may also allow the user compose new experiences by selecting metadata associated with content, and selecting different routes to create new combinations of the same source data In many implementations, it may be desirable to have a well known location for finding predefined or ad hoc streams that are sorted by content, for example. In reference now to FIG. 4, a block diagram 400 illustrates a possible channel hierarchy according to an embodiment of the invention. The root node 402 describes the main portal for receiving content, in this case a video portal. One content area below the root 402 involves paid subscription streaming as represented by node 404. Another content area, represented by node 406, allows users to download media on demand. Node 408 represents categories of dynamic streaming channels. Some of these dynamic channels 408 may be commercial 410, public 412 (e.g., governments, non-profit organizations), or ad hoc 414.

As indicated by the name, the ad hoc channels 414 are generally provided by individual peers, and may be transitory or permanently available. For example, a sub-category such as "1$^{st}$ of May" 416 may be purposefully limited in time, although may have no limitations on location. A sub-category such as "Paris/Baghdad Today" 418 may be permanently available (e.g., no limits on time the category 418 is available to viewers), even though the content may be constantly be changed or updated as time goes on. Other categories may be related specific events that are limited in both place and time, such as a regatta 420 or music festival 422. Each of these categories 416, 418, 420, 422 may provide a plurality of substreams/subchannels as indicated by channels 422a-e.

Each of these channels 422a-e may correspond to a particular content creation device, or include a group of devices recording a coherent event, such as a particular performer or stage at a concert. As such, the channels 422a-e may not be always available. For example, channels 422a-c may correspond to individual performances, and therefore may be only be active (at least for live streaming) while the performance is going on. Depending on the number of devices and on the caching capability of the system, live streams may be available for some period of time after the performance or event.

It will be appreciated that, in situation such as live performances, the capturing of media streams 422a-e may raise legal issues, such as the distribution of copyrighted content. However, such a system provides a way to track the metadata as the content is being captured, and also track requests for both the metadata and the actual content. Therefore, entities that collect, process, and redistribute the metadata can determine viewership of a given event, and this viewership data can be used compensate performers accordingly. This compensation may come from advertisers who insert ads into the content and/or from viewers who ultimately view the material. In addition, to encourage the use of the authorized system (as opposed to making unauthorized bootlegs), users capturing the content may be provided some benefit, such as free WiFi access at the venue, or some other exchange of value. For example, a typical mobile device may have enough available to capture some 5-10 minutes of video, but if the content creator has the ability to stream the video via WiFi and store it in an off-device cache, then the content creator may be able to capture much more material. Thus, in exchange for agreeing not to illegally distribute the captured media (e.g., by entering into a contract or securing the captured content using digital rights management) the user may be given access to the WiFi and a local P2P cache, and be allowed to later access the cached copy for his/her own use. Any other uses of the content, including viewing of the live stream, could be controlled by the metadata distributors and copyright holders. The content creators also may be able to gain additional benefits (e.g., money or credit) if recorded or streamed content generates significant revenue for the stakeholders.

Such a system may allow a number of different business models to be used based on the particular media and content involved and consumer audience. For example, metadata could be freely available while the actual content is commercial. In another example, the P2P content delivery could be freely available, but supplemented with advertisements. In some cases, the content creators may be provided with something of value in order to capture the content at a particular moment. The content creator may be able to gain money/credits or a reduction in their service rates if they agree to record a particular event. For example, if a metadata server gets a request to view a particular street intersection, it may send a text message to a subscriber walking down that street asking them to point their camera at the intersection for five minutes to reduce their phone bill by some amount.

In one case, the metadata stream consists only of data inserted from the originating device. However, it can also contain data created by other members of the community. In particular, the metadata stream can contain information descriptive of the dynamically changing viewer population. For example, in the automatic selection of the streams, a popularity ranking could be an important parameter, and may be used to determined what one's peers or friends are currently viewing. Likewise the stream could contain bookmarks added by viewers, ratings, etc. Such information could also be interesting for the content creator and an incentive to keep on capturing content.

Figure 4:
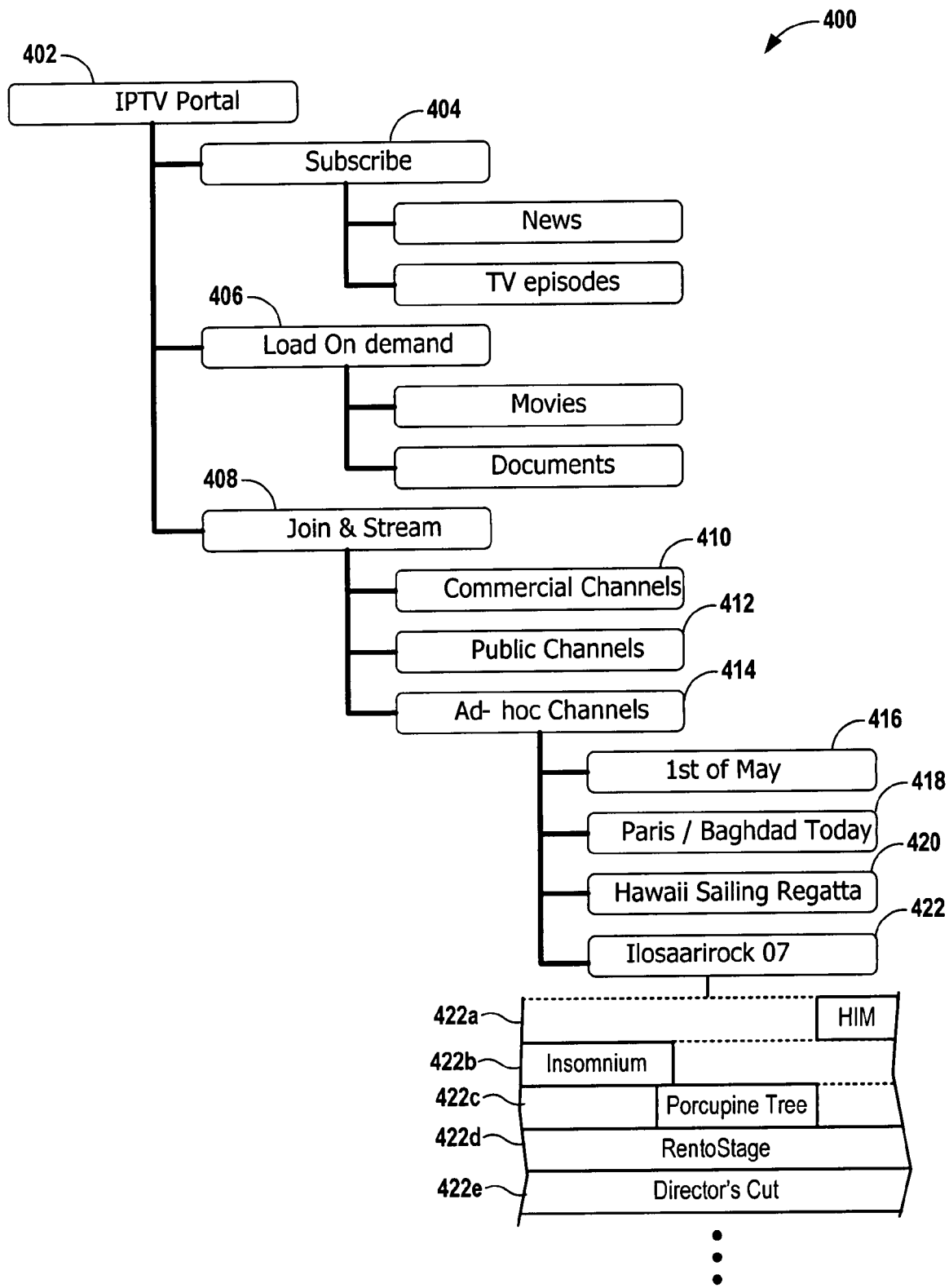
FIG. 4 is a block diagram illustrating a program hierarchy according to an embodiment of the invention.

For the efficiency of the P2P delivery system (via techniques like CoolStreaming) it may be useful to identify whether a large number of users are viewing exactly the same content. In such a case, an automatic mixing feature may try to create (by using the metadata) such a combination of streams that would satisfy most viewers. In the example of FIG. 4, this is represented by the "Directors Cut" stream 422e, which may combine combinations of stored and real-time streams to create a more coherent experience. Such a combination stream 422e, if provided by a system administrator or event organizer, may have access to other valuable data or content that might not be available by the peers. In the music festival example, such value-added content may be a high quality audio feed that is uninterrupted and synced with the video of various independent feeds provided by content creator devices.

It will be appreciated that in situations where an event is recorded by multiple people using limited capacity mobile devices, the available content may be comprised of numerous small clips, each differing due to the different devices and storage spaces of multiple persons capturing the clients. With the P2P technology, it is possible to access this material, but finding the interesting clips is difficult, as it requires viewing multiple clips from multiple persons one by one. As described above, an automatic film director could compile a long video out of fragments distributed in many devices based on a general level description of the desired result. Such a film could be prepared for one-shot viewing, and could be discarded immediately after viewing has been completed. In such a case, there is no need to aim for a very high quality artistic result. Of primary interest is the ease of defining a general description of a content feed, automatically compiling content that satisfies that description, and quickly viewing that compiled content.

One goal of a metadata streaming and search system may be to create a user experience of looking at one video consisting of multiple scenes, even if in reality the material comes from multiple devices and consists of multiple small fragments. For example, assume the user wants to see video coverage of an accident or catastrophe. The video material may be very recent or real-time, and stored clips can be merged with real time streamed material. The user may want to see in relatively fast pace how the situation developed but mainly focus on what is happening now. Looking at the same situation from different angles via different cameras allows the viewer to focus on interesting parts. Seeing some important event happening multiple times may not be a problem in such a scenario. This material could be for personal consumption for interested persons but also for further delivery via broadcast corporations. A broadcast corporation could add value to such a stream, for example, by adding their own audio stream of commentary or live news reports.

In another example, assume a cousin in Australia would like to experience, via multimedia, a family event happening in another country (e.g. christening of a newborn). Most likely multiple visitors have captured the event on video and photos. Viewing a combination of still photos with the videos taken from the different sources could be possible, either in real time or in playback. Another variation would be to play the recorded sound of the event constantly from one source, and show pictures/videos from multiple sources. Such a combined multimedia event would be interesting in real-time, and a recording of the combined multimedia could be a nice summary of the event for the participants as well.

In another example, a "virtual tourist" service may allow a person to pick a route from a map in some interesting city (e.g. walk around Île de la Cité in Paris). The system would stream photos taken in this area by different people (mostly tourists) that they have recently captured. If a particular area within the route interests the viewer, they can stop and view more photos of that area. The viewer may also go back in time to see how the route looks in the winter or in the summer (snow, tree with leaves, etc.). Similarly, clips may be classified by time of day (e.g., daytime vs. nighttime), weather, and other factors. In one configuration, it may be possible to arrange the views in a chronological stream of photos showing how the place changes in different times of the year. If older material is available, this could be extended to show how the place has changed over the decades (new buildings, cars, fashion styles, etc.)

Content discovery, (e.g., finding and selecting the best matching data) is an important design factor in such a system, especially in live and interactive use cases when it has to be done very quickly in a dynamic setup. The content may be streamed by hundreds of users at the same time. The individual streams are typically short, and streaming positions and directions may constantly change. Users may be coming and going all the time, thus single stream items can easily disappear and reappear.

One capability of such a system is to combine a set of items to a comprehensive multimedia experience. It allows specifying free-form trajectories (e.g. routes) and the system combines relevant multimedia along that trajectory. The trajectories can consider the camera direction and the popularity of multimedia material, and may support streaming of real time content (live coverage). The access speed to multimedia items may be one criterion for deciding the display order. Finer granularity supports more consumption scenarios and in some instances a more atomic multimedia item can be reused in more places than a larger multimedia item.

The system includes mechanisms for finding, accessing, and consuming multimedia data that is stored or captured by different community members. The user specifies his interest and the system dynamically assembles a personal and unique multimedia experience by combining items coming from multiple devices. Guided by an automatic selection mechanism the system retrieves and replicates the fragments in a P2P fashion and represents them as a unified multimedia experience. The method scales to exploding numbers of available multimedia sources and types including still images, video clips, live streams, audio clips, audio streams, etc. P2P technologies are able to handle massive amounts of data while the automated search mechanisms hide from the user the increased complexity of prioritizing and selecting the matching data sources.

Figure 5:
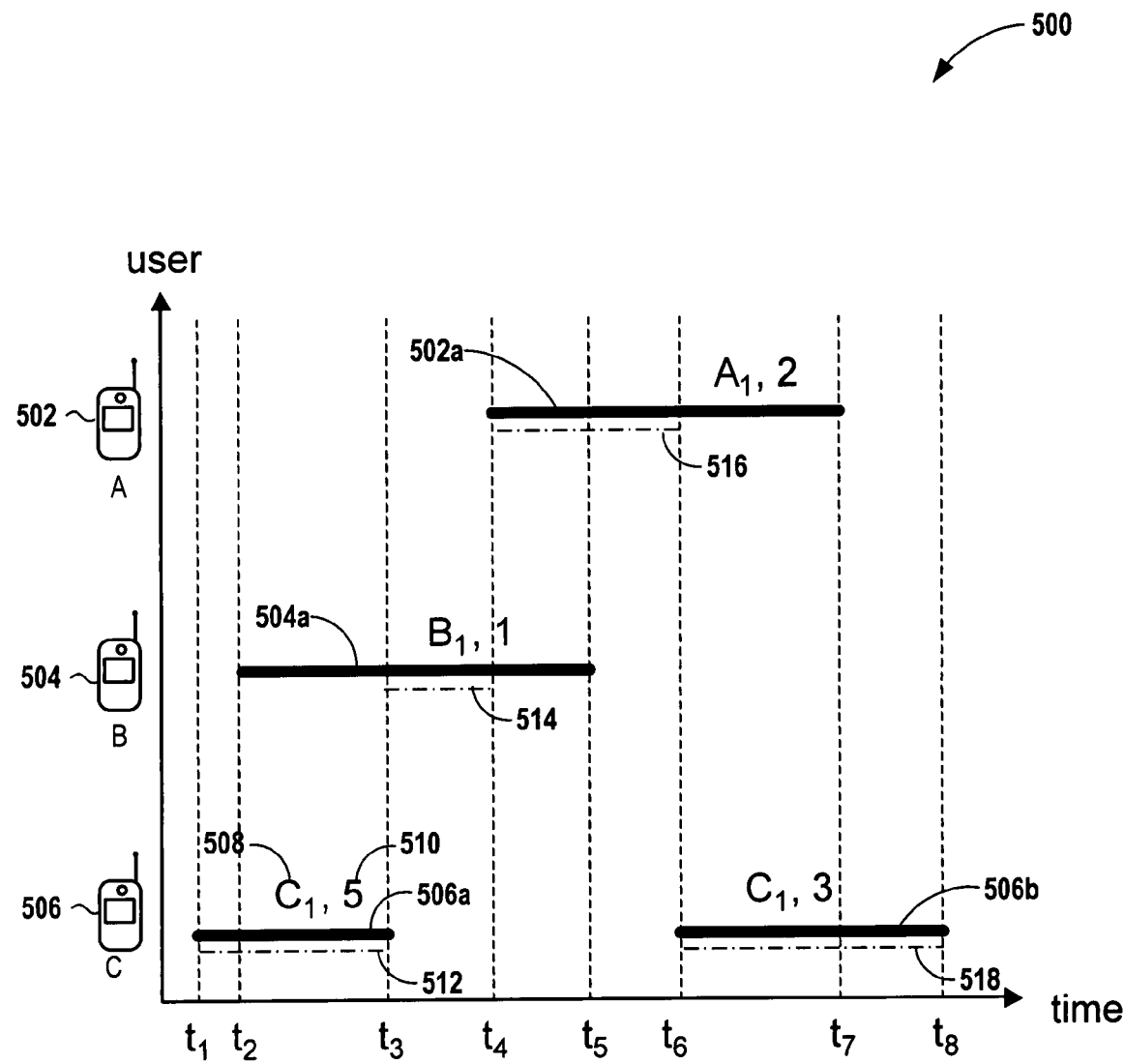
FIG. 5 is a block diagram illustrating a video compilation timeline according to an embodiment of the invention.

The mechanism allows a user to specify what is interesting to him (trajectory, time, etc), and search for the appropriate multimedia material available in peer devices. A video experience is automatically compiled out of the material (e.g., using criteria such as match accuracy, popularity, accessibility) and the multimedia material is streamed or downloaded from the different sources to the users device for viewing. The user can modify his preferences, and in response the material selection streamed to the user would be adjusted accordingly. Such a multimedia stream may be formed by combining different kinds of multimedia, from simple still images to live video streams. The system could compose new experiences by selecting different routes and different combinations of the same source data For important events, there may be a lot of video material which is partly overlapping. This is shown in FIG. 5, which shows a video compilation timeline 500 according to an embodiment of the invention. In this example, three content creation devices 502, 504, 506 capture clips 502*a*, 504*a*, 506*a-b* that may include both content and metadata (indicated by bold lines) during the times indicated. Each of the content/metadata clips is labeled to indicate the originating device and clip number (e.g., label 508) and a popularity rating (e.g., label 510). As is evident from the diagram, the various metadata/content streams are overlapping in time to some extent.

One issue in a situation such as shown in FIG. 5 is how to choose which, if any, of the overlapping material 502*a*, 504*a*, 506*a-b* to stream to the user. In many cases, the set of candidate video clips can be been narrowed down using a rough time and location search. One way of refining this further is to use the shooting time as the primary criterion. In such a case, the goal is to create a chronologically progressing video. In FIG. 5 the content is selected 502*a*, 504*a*, 506*a-b* as indicated by dashed lines 512, 514, 516, 518. When there are conflicts as to shooting time, then other factors such as the popularity of a video clip, video quality, network/device bandwidth, etc. may control the selection. In this example, both clips 502*a* and 506*b* overlap between times $t_6$ and $t_7$ and so the popularity of the videos are used as the primary criterion, such that the most popular clips are chosen first for viewing, while still preserving the chronological order of the clips. Therefore, because clip 506*b* has a popularity rating of 3 and clip 502*a* has a popularity rating of 2, clip 506*b* is chosen to fill that gap between times $t_6$ and $t_7$ as indicated by line 518. In other selection scenarios, the popularity might also drive the presentation order of the clips. In such a case, clip 506*b* would be shown before either clips 502*a* or 504*a*, and reduction of the clip times may not be needed.

Figure 6A:
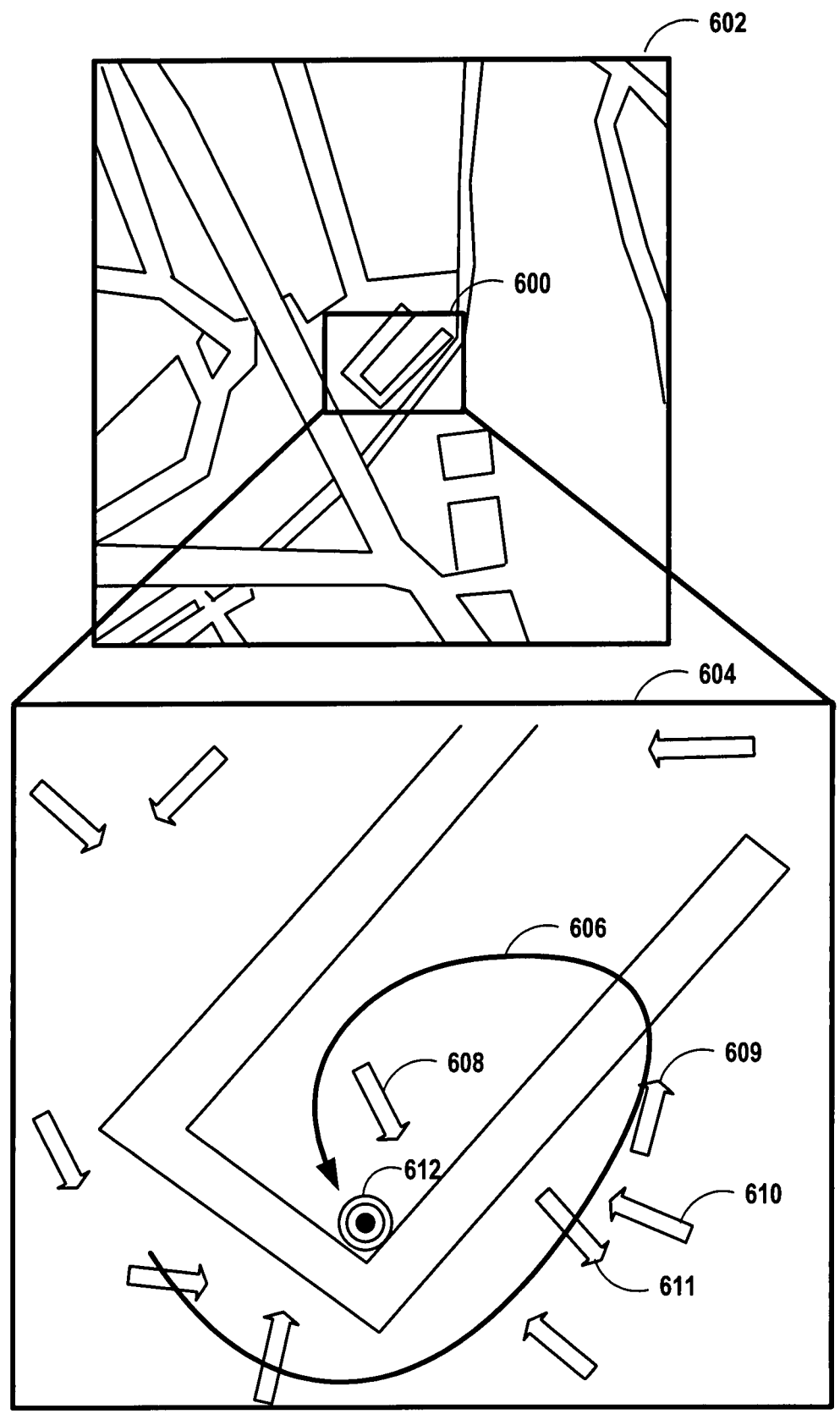
FIG. 6A is a diagram of a user interface for selecting media clips according to embodiments of the invention.

Another way to refine the selection of clips is to use the shooting position as the primary criterion. This is illustrated in FIG. 6A, which shows selection of media clips based on shooting position according to embodiments of the invention. Generally a region 600 of a map 602 is selected, and an editing user interface 604 is presented to the viewer based on this selection. The viewer controls the shooting location by choosing/creating a trajectory 606 on the map interface 604. The trajectory 606 can be created, for example, by using a mouse, touchscreen, joystick-type controller (e.g., right, left, zoom), list selection, name search, etc. The available video clips that may satisfy the particular time and space constraints of the trajectory 606 are shown on the interface as arrows, e.g., arrows 608-611. The availability of the clips for a given area (and therefore the number of arrows displayed) may be increased or decreased by changing a time constraint, or changing some other filter criteria.

The video clips/streams that best match the requested path 606 could be compiled and streamed. This trajectory 606 may be user-defined (e.g., using a drawing tool) or automatically be defined by specifying a shooting target location (e.g., target location 612) as the primary criterion. The user specifies that he wants videos/pictures of the given location 612 by using a map, joystick, text search, etc., and the video best matching where the estimated shot target is chosen. As can be seen by the direction and location of the arrows, there may be a difference in between specifying a location, a path, and a target. For example, if footage along path 606 is desired without regard to direction, then clip 611 may be included in a compiled stream, because it lies on the path 606. If, however a compiled stream was requested that followed the path 606, then clip 611 may not be selected because the direction of clip 611 is orthogonal to the path. However, in that case clip 609 may be selected because it is roughly aligned with the path 606. If a compiled stream was requested that included target 612, whether on path 606 or not, neither clips 609, 611 may be selected, because they are pointing away from target 612; however clip 610 may be a likely candidate in that case.

Figure 6B:
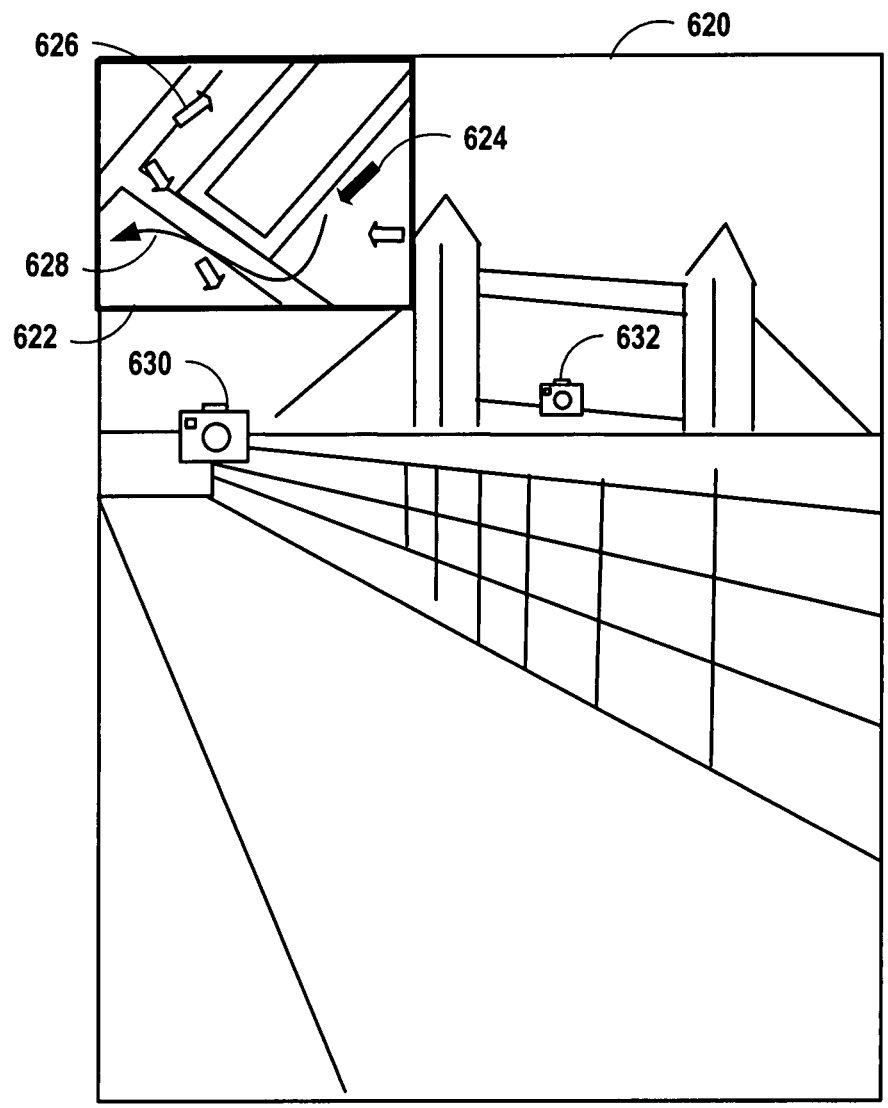
FIG. 6B is a diagram of a content rendering window according to an embodiment of the invention.

It will be appreciated that a map-type editing interface may also be useful to control the current playback of media that is obtained via the use of a map and/or path data. In FIG. 6B, a content rendering window 620 according to an embodiment of the invention is overlaid with a metadata selection interface panel 622. Similar to the editing interface 604 of FIG. 6A, the selection interface panel 622 here includes media capture device icons (e.g., arrows 624, 626), path data 628, and may include mapping, target, and other data as previously described. The selected/currently playing media source may be highlighted differently, as represented by darkened arrow 624. The user may change the content rendered in the window 620 by selecting a different arrow icon in the selection interface 622. The user may also be able to change the content by selecting other objects in the interface 622, such a path or target indicator (e.g., icons 606 and 612 in FIG. 6A).

The interaction between the selection interface 622 and rendering area 620 may also be extended to allow the display of metadata directly on the rendered image. For example, overlay icons 630, 632 may represent other available content creators that are represented on the 2-D map 622. However, the placement of the icons 630, 632 also allows the viewer to determine a 3-D location of the content creators relative to the current media, and therefore better judge whether the source content is desirable.

One extension to this concept is to use the content (e.g., content represented by icons 630, 632) to create a 3-D representation of the content that can be rendered in the display 620. For example, media capture devices may have multiple photos/videos available of an object from different directions (and perhaps other metadata that describes how, why, when the data was captured). A device and/or server can be configured to create a 3D presentation of the object that can be experienced via a rendering device such as the display 620. The viewer would then be able to view this 3-D object (or other content, such as 3-D video, 3-D sound, etc.) with suitable 3-D rendering hardware. The 3-D rendering can be viewed as a playback or interactive media, or may be combined with live media, such as a live camera view shown on the display 620.

Another extension of the invention would allow inserting advertisement clips into the compiled multimedia stream. For instance, a freely available phone client would periodically insert an advertisement video acquired from an advertisement server into the multimedia stream. The advertisement server could take advantage of the criteria used for the primary content of the video compilation to pick advertisements that would fit the context. A premium version of the phone client may allow skipping the ads in return for purchase of the premium application or the ad-free service. Similarly, ads may be placed into the metadata streams. For example, a graphical metadata selection tool (e.g., interface 604 in FIG. 6A) may include paid placements in the form of tags on the map that indicate the location of businesses.

Figure 7:
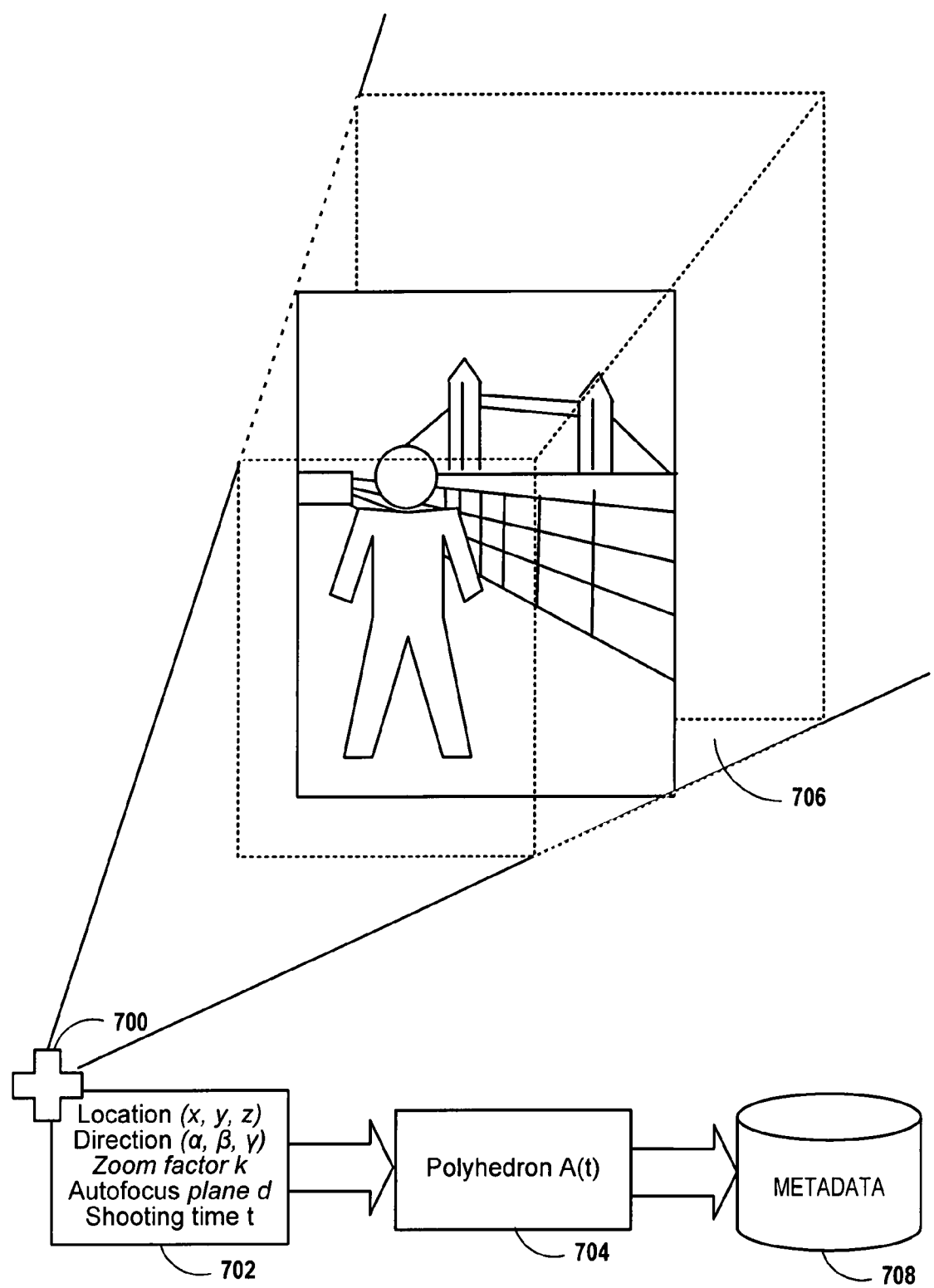
FIG. 7 is block diagram of locational metadata processing according to an embodiment of the invention.

It will be appreciated that the description of specifying content paths and locations can be extended into 3-D space. In the video example of FIGS. 6A-B, the elevation (e.g., angle with respect to the ground) of the arrows is not visible in the 2-D map views. In one alternate, a 2-D side view or 3-D view may allow viewing the elevation angles of the camera views. In reference now to FIG. 7, a block diagram illustrates of generation of 3-D metadata according to an embodiment of the invention. Generally, a camera view 700 may be defined by 702 data such as camera location, viewing directions/angles, autofocus distance, and zooming factor. At any given time, this data 702 can be used to derive data 704 that describes a polyhedron 706 (show bordered with in dashed lines) as a function of time. The descriptive data 704 may be placed in a metadata repository 708 and be subject to search queries to find content of interest using a 3-D search specification. The determination of the polyhedron data 704 may be performed at the capture device, and the metadata repository 708, and/or at some intermediary node.

Figure 8:
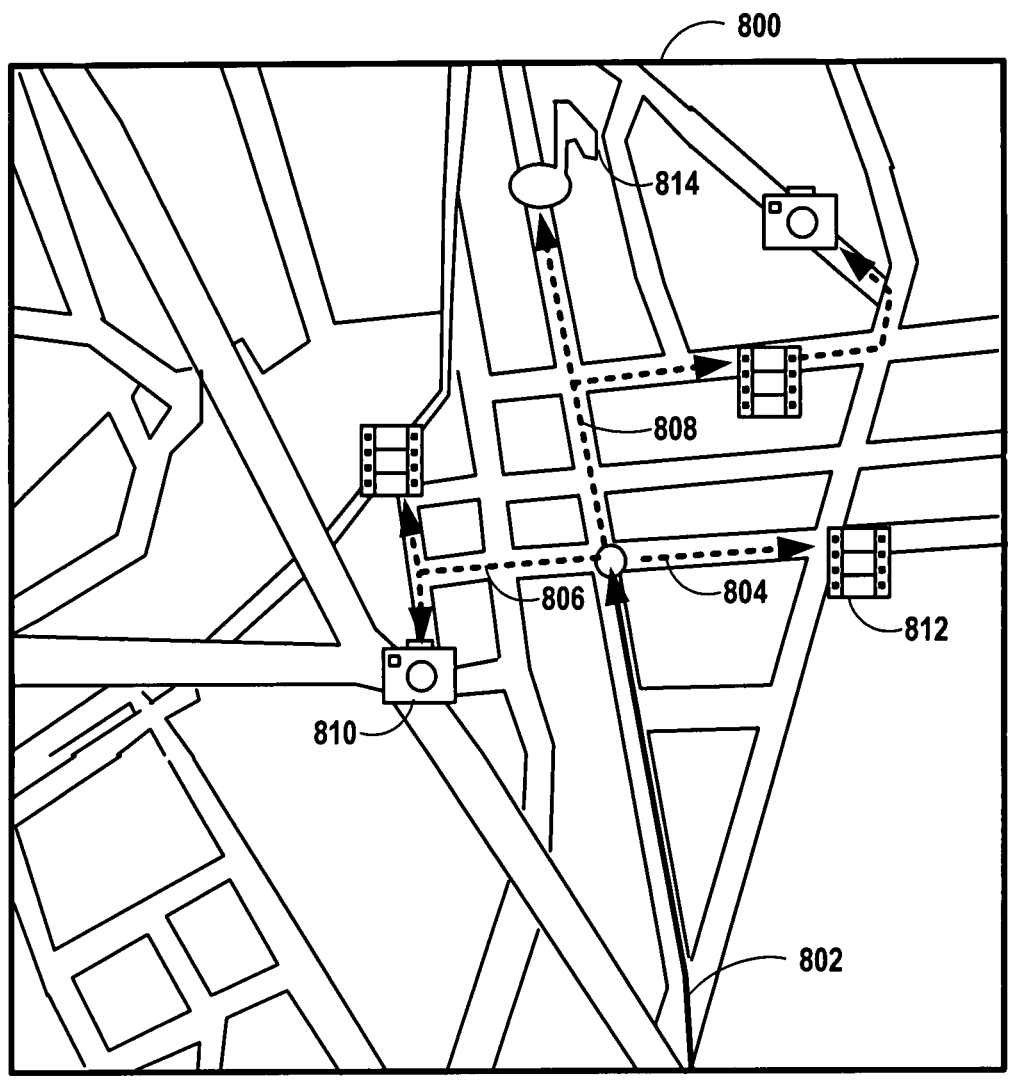
FIG. 8 is diagram of a user interface that provides metadata based on predicted routes according to an embodiment of the invention.

As previously discussed with reference to FIG. 6A, a user may create a route, such as by viewing a map and plotting a path of interest on the map. Based on this route, the user may select a number of content feeds that lie on or near the route. However, it will be appreciated that a route may not always be known beforehand. An example of this is shown in FIG. 8, which illustrates a mobile device interface screen 800 according to an embodiment of the invention. A tourist may use a mobile device with the illustrated mapping screen 800 while wandering in a city looking something interesting, but with no predefined target in mind. It will be appreciated that the tourist may be real or virtual. In the latter case the tourist's actual location may be different than that shown on the mapping screen. The tourist may be capable of tracking a current route 802, such as via a GPS built into a mobile device. This route data 802 may have use as a historical record, such by as creating a memento of the journey and/or by helping the tourist find the way back to where he or she started.

The route data 802 may also be used to create possible predicted routes (e.g., predicted paths 804, 806, 808), and in particular routes going in directions that the tourist has not yet visited. This future course data 804, 806, 808 could also be used as the subject of a query to a centralized or distributed metadata repository (e.g., server 112 in FIG. 1). In response to such a query, the repository returns results that are relevant as at least to place and time, and those results are shown as icons on the map 800 (e.g., icons 810, 812, 814). These icons may indicate the type of available content (e.g., icon 810 indicates photos, icon 812 indicates video, and icon 814 indicates sound). A popup or rollover dialog (not shown) may provide textual metadata of interest when a cursor is placed over one of the icons 810, 812, 814. Therefore, as the tourist moves on they may pause and check the map for icons of interest. By selecting an icon, the tourist can experience the media, such as by way of a peer-to-peer transfer from the creator of the content. This media may be useful in helping the tourist discover places and happenings of interest.

Figure 9:
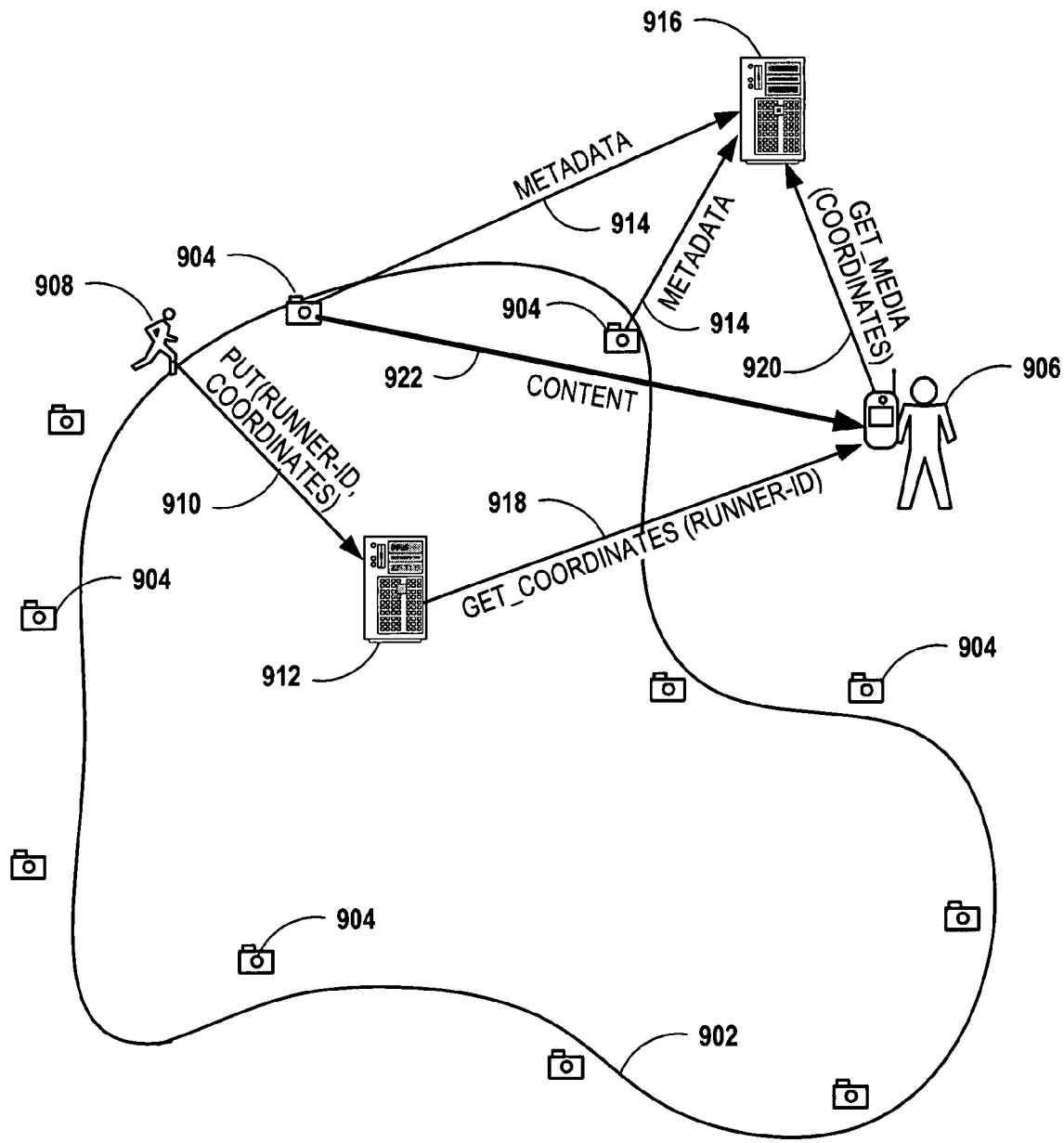
FIG. 9 is block diagram the use of dynamic route data to provide media according to an embodiment of the invention.

Another example of how a dynamic route can be used to identify media of interest is shown in the block diagram of FIG. 9. A fixed route 902 is shown that may be used for a sporting event such as a marathon. A number of cameras 904 are located around the route 902. The cameras 904 may include any combination of fixed and mobile devices, and may be operated by event organizers and/or observers. A viewer 906 may be interested in seeing a particular participant 908 in the event. The participant 908 carries a mobile locator device (e.g., device with GPS sensor and data transmitter) that causes the participant's current location 910 to be sent in real time to a sports event server 912. Similarly, during the event cameras 904 can send metadata 914 to a metadata repository 916. This metadata 914 may at least describe location and times associated with content captured by the cameras. Other metadata 914 may be venue specific. In this example, the runners may have RFID tags, and the cameras are capable of reading the tags as the runners pass by. In this way, the race organizers can easily track participant times, and the RFID identifiers can also be included with the camera metadata 914 as a backup to the geolocation data 910.

The viewer 906 wishes to see this particular participant 908 (and perhaps others), and therefore accesses location data 918 from the sports event server 912 based on an identifier associated with the participant 908. The location data 918 may include a route with previous times and locations, and/or the location data 918 may also contain real time location updates. The viewer's device uses the location data 918 to query 920 the metadata repository 916. In response the query 920, the viewer's device can obtain content 922 from one or more cameras that are likely to have captured (or are currently capturing) an image of the participant 908. As shown here, the content 922 is obtained from a peer-to-peer transfer, however the content may be stored or buffered elsewhere, such as sports event server 912.

Figure 10:
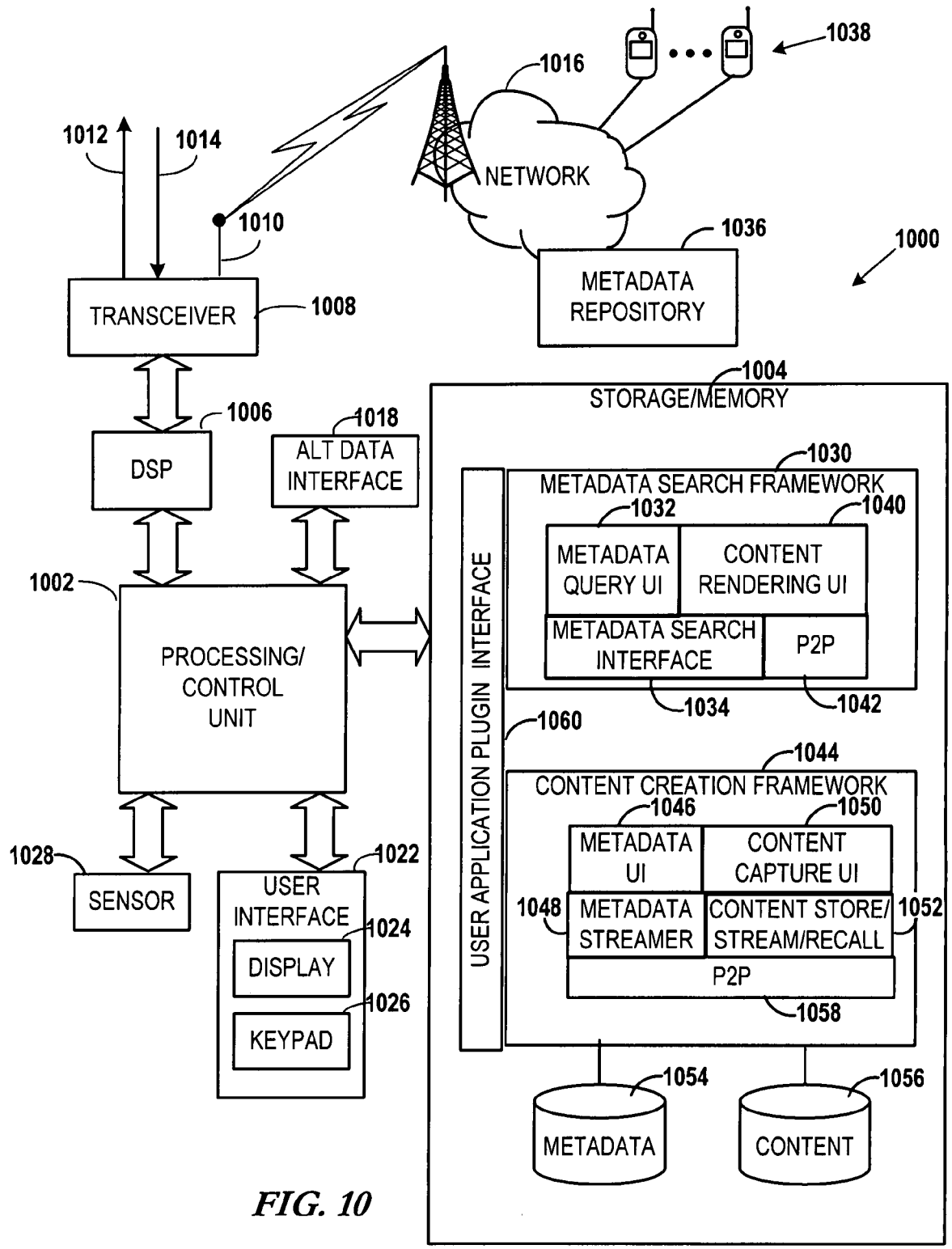
FIG. 10 is block diagram of a mobile computing arrangement according to an embodiment of the invention.

Many types of apparatuses may be able to participate in content creation and metadata/content discovery as described herein. Mobile devices are particularly useful in this role. In reference now to FIG. 10, an example is illustrated of a representative mobile computing arrangement 1000 capable of carrying out operations in accordance with embodiments of the invention. Those skilled in the art will appreciate that the exemplary mobile computing arrangement 1000 is merely representative of general functions that may be associated with such mobile devices, and also that landline computing systems similarly include computing circuitry to perform such operations.

The processing unit 1002 controls the basic functions of the arrangement 1000. Those functions associated may be included as instructions stored in a program storage/memory 1004. In one embodiment of the invention, the program modules associated with the storage/memory 1004 are stored in non-volatile electrically-erasable, programmable read-only memory (EEPROM), flash read-only memory (ROM), hard-drive, etc. so that the information is not lost upon power down of the mobile terminal. The relevant software for carrying out conventional mobile terminal operations and operations in accordance with the present invention may also be transmitted to the mobile computing arrangement 1000 via data signals, such as being downloaded electronically via one or more networks, such as the Internet and an intermediate wireless network(s).

The mobile computing arrangement 1000 includes hardware and software components coupled to the processing/control unit 1002 for performing network data exchanges. The mobile computing arrangement 1000 may include multiple network interfaces for maintaining any combination of wired or wireless data connections. In particular, the illustrated mobile computing arrangement 1000 includes wireless data transmission circuitry for performing network data exchanges.

This wireless circuitry includes a digital signal processor (DSP) 1006 employed to perform a variety of functions, including analog-to-digital (A/D) conversion, digital-to-analog (D/A) conversion, speech coding/decoding, encryption/decryption, error detection and correction, bit stream translation, filtering, etc. A transceiver 1008, generally coupled to an antenna 1010, transmits the outgoing radio signals 1012 and receives the incoming radio signals 1014 associated with the wireless device.

The incoming and outgoing radio signals 1012, 1014 are used to communicate with a mobile service provider network 1016. The network 1016 may include any voice and data communications infrastructure known in the art, including CDMA, W-CDMA, GSM, EDGE, etc. The network 1016 typically provides access to traditional landline data infrastructures, including IP networks such as the Internet. The mobile computing arrangement 1000 may also include an alternate network/data interface 1018 capable of accessing the network 1016 and/or a proximity network (not shown). The alternate data interface 1018 may incorporate combinations of I/O and network standards such as USB, Bluetooth, Ethernet, 802.11 Wi-Fi, IRDA, etc.

The processor 1002 is also coupled to user-interface elements 1022 associated with the mobile terminal. The user-interface 1022 of the mobile terminal may include, for example, a display 1024 such as a liquid crystal display. Other user-interface mechanisms may be included in the interface 1022, such as keypads 1026, speakers, microphones, voice commands, switches, touch pad/screen, graphical user interface using a pointing device, trackball, joystick, etc. One or more sensors 1028 may also be coupled to the processor 1002 for purposes such as capturing content and metadata related to that content. These and other external interface components are coupled to the processor 1002 as is known in the art.

The program storage/memory 1004 typically includes operating systems and programs for carrying out functions and applications associated with functions on the mobile computing arrangement 1000. The program storage 1004 may include one or more of read-only memory (ROM), flash ROM, programmable and/or erasable ROM, random access memory (RAM), subscriber interface module (SIM), wireless interface module (WIM), smart card, hard drive, or other removable memory device. The storage/memory 1004 of the mobile computing arrangement 1000 may also include software modules for performing functions according to embodiments of the present invention.

In particular, the program storage/memory 1004 may include a metadata search framework 1030 that allows the user to find metadata related to content, and access that content for further use. The metadata search framework 1030 may include a query user interface (UI) 1032 that allows a user of the device 1000 to form queries, such as by using graphical (e.g., maps, network node diagrams) or text inputs to find a particular set of metadata. The query UI performs the queries through a metadata search interface 1034 which is capable of performing the queries via one or more network-accessible metadata repositories 1036. The metadata repository 1036 provides access to metadata provided by content creation devices 1038, such metadata describing the content captured by the devices 1038.

In response to the queries, the metadata repository 1036 may return to the search interface 1034 a response that includes the metadata (or a summary thereof) and may include access data that allows the content to be directly accessed from the creation devices 1038. The access data may be used by a content rendering UI 1040 that is capable of accessing the content directly via the network 1016 and rendering the content to the user. One or both of the metadata and content may be accessed directly from creators 1038 via an ad-hoc peer-to-peer (P2P) network. A P2P module 1042 may provide the capability for one or both of the content rendering UI 1040 and the metadata search interface 1034 to use the protocols of the P2P network.

Besides viewing content, the mobile arrangement 1000 may be used to create content, as represented by the content creation framework 1044. This framework 1044 may include a metadata UI 1046 that allows the user to control what metadata is captured (e.g., location, time, user profile), the rate the metadata is captured/streamed, define static metadata (e.g., user profile), whether the metadata is stored, permissions to view the metadata, cleansing of personal data from the metadata, etc. A metadata streamer 1048 uses the use settings made via the UI 1046, captures the metadata via the sensor(s) 1028 and streams the metadata via the network 1016 to the repository 1036. The metadata streamer 1048 may also store both static and dynamic metadata in a local metadata database 1054, and the locally stored metadata 1054 may be associated with locally stored content 1056 that the metadata 1054 describes.

The streaming of metadata via the streaming component 1048 may occur contemporaneously with the capture of content via a content capture UI 1050 and a content storage/streaming/recall module 1052. The UI 1050 allows the user to view content capable of being captured via sensor(s) 1028, control the capture of the content, and make other configuration settings (e.g., frame rates, size limits, etc.). The storage/streaming/recall module 1052 may format the content, facilitate storage of the content to the local datastore 1056, facilitate live streaming of the content to others via the network 1016, and facilitate recall and transmission of content from the local datastore 1056 to a peer 1036, 1038. Both the metadata and content may be sent to peers 1036, 1038 via a P2P module 1058, which handles formats and protocols of the appropriate P2P networks.

The metadata search framework 1030 and content creation framework 1044 can be tied together and share common components. For example, both content creators and content consumers may require the use of compatible metadata and content formats, thus libraries that produce and read these formats could be shared between the frameworks 1030, 1044. In addition, the frameworks 1030, 1044 may be integrated with other applications, such as via user application plug-in interface 1060. This interface 1060 may provide hooks that allow other applications to use the functionality of the frameworks 1030, 1044, and/or the interface 1060 may allow the frameworks 1030, 1044 to be formed as plug-ins that extend the functionality of the applications.

Figure 11:
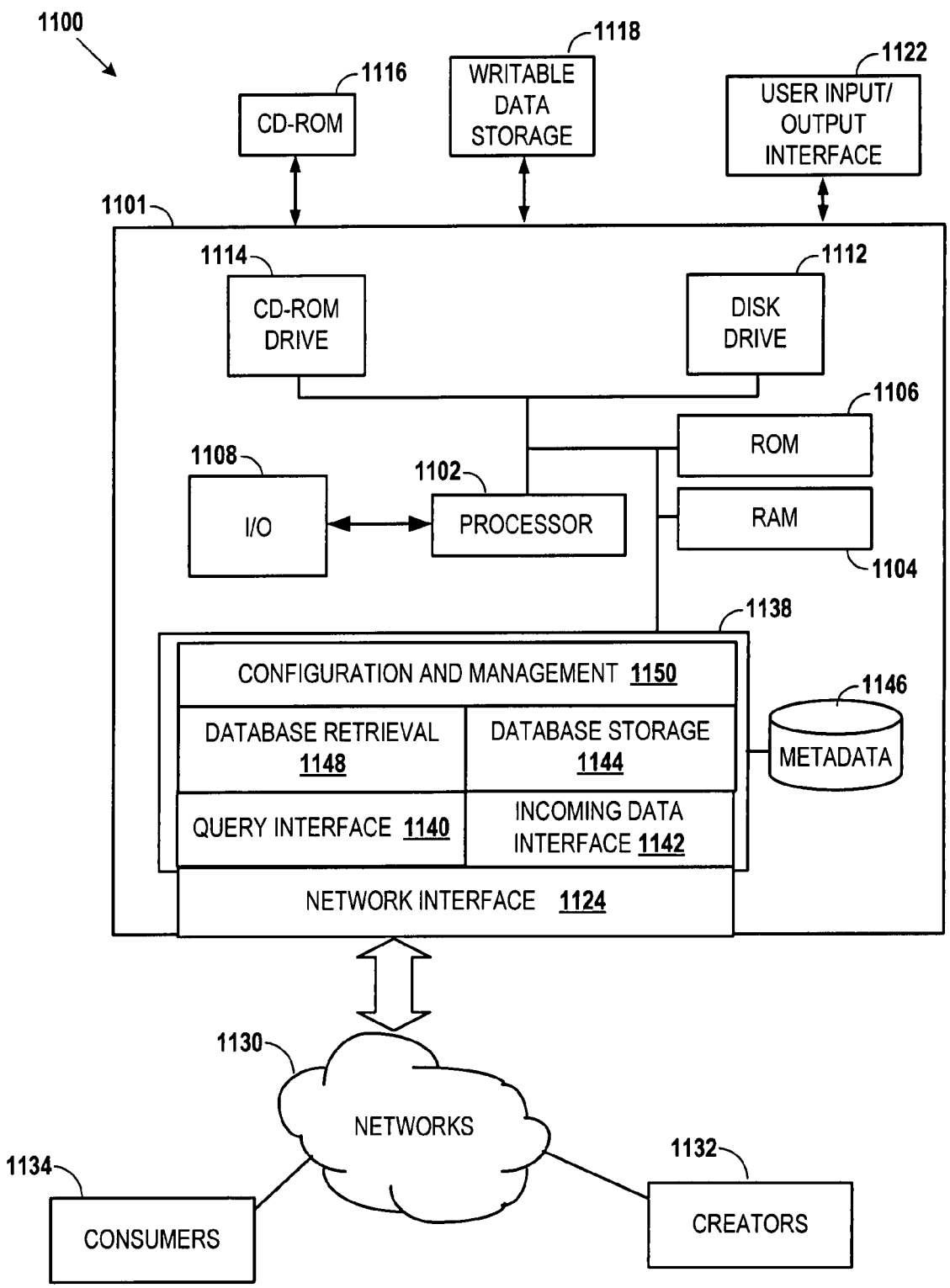
FIG. 11 is block diagram of a metadata repository arrangement according to an embodiment of the invention.

A content discovery system as described herein can be implemented using one or more network servers to coordinate, gather, and distribute metadata that describes the content. In reference now to FIG. 11, a block diagram illustrates an example metadata server 1100 according to an embodiment of the invention. The metadata server 1100 includes a computing arrangement 1101. The computing arrangement 1101 may include custom or general-purpose electronic components. The computing arrangement 1101 includes a central processor (CPU) 1102 that may be coupled to random access memory (RAM) 1104 and/or read-only memory (ROM) 1106. The ROM 1106 may include various types of storage media, such as programmable ROM (PROM), erasable PROM (EPROM), etc. The processor 1102 may communicate with other internal and external components through input/output (I/O) circuitry 1108. The processor 1102 carries out a variety of functions as is known in the art, as dictated by software and/or firmware instructions.

The computing arrangement 1101 may include one or more data storage devices, including disk drives 1112, CD-ROM drives 1114, and other hardware capable of reading and/or storing information such as DVD, etc. In one embodiment, software for carrying out the operations in accordance with the present invention may be stored and distributed on a CD-ROM 1116, writable data storage media 1118 or other form of media capable of portably storing information, including magnetic media, flash memory, etc. These storage media may be inserted into, and read by, devices such as the CD-ROM drive 1114, the disk drive 1112, I/O ports 1108, etc. The software may also be transmitted to computing arrangement 1101 via data signals, such as being downloaded electronically via a network, such as the Internet 1130. The computing arrangement 1101 may be coupled to a user input/output interface 1122 for user interaction. The user input/output interface 1122 may include apparatus such as a mouse, keyboard, microphone, touch pad, touch screen, voice-recognition system, monitor, LED display, LCD display, etc.

The computing arrangement 1101 may be coupled to other computing devices via networks. In particular, the computing arrangement includes a network interface 1124 for communicating with networks 1130. The network interface 1124 may include a combination of hardware and software components, including media access circuitry, drivers, programs, and protocol modules. The networks 1130 may include any combination of private or public networks such as the Internet. The networks 1130 allow the computing arrangement 1101 to communicate with entities such as content creation devices 1132 and content consumer devices 1134.

The computing arrangement 1101 includes processor executable instructions 1138 for carrying out metadata management tasks of the computing arrangement 1101. These instructions 1138 may include a query interface 1140 for communicating with content consumers 1134 and an incoming data interface 1142 for receiving metadata from content creators 1132. The incoming metadata may be passed from the incoming data interface 1142 to a database storage module 1144 that analyzes, reduces, correlates and otherwise processes the incoming metadata before storing it in a database 1146. The incoming queries from the query interface 1140 are processed and passed to a database retrieval interface 1148, which accesses the database 1146 and returns the results to the content consumers 1134. A configuration and management interface 1150 provides a human accessible interface to control the operation parameters of the various instruction and data modules, and allows for other management functions such as logging, monitoring, etc.

Figure 12:
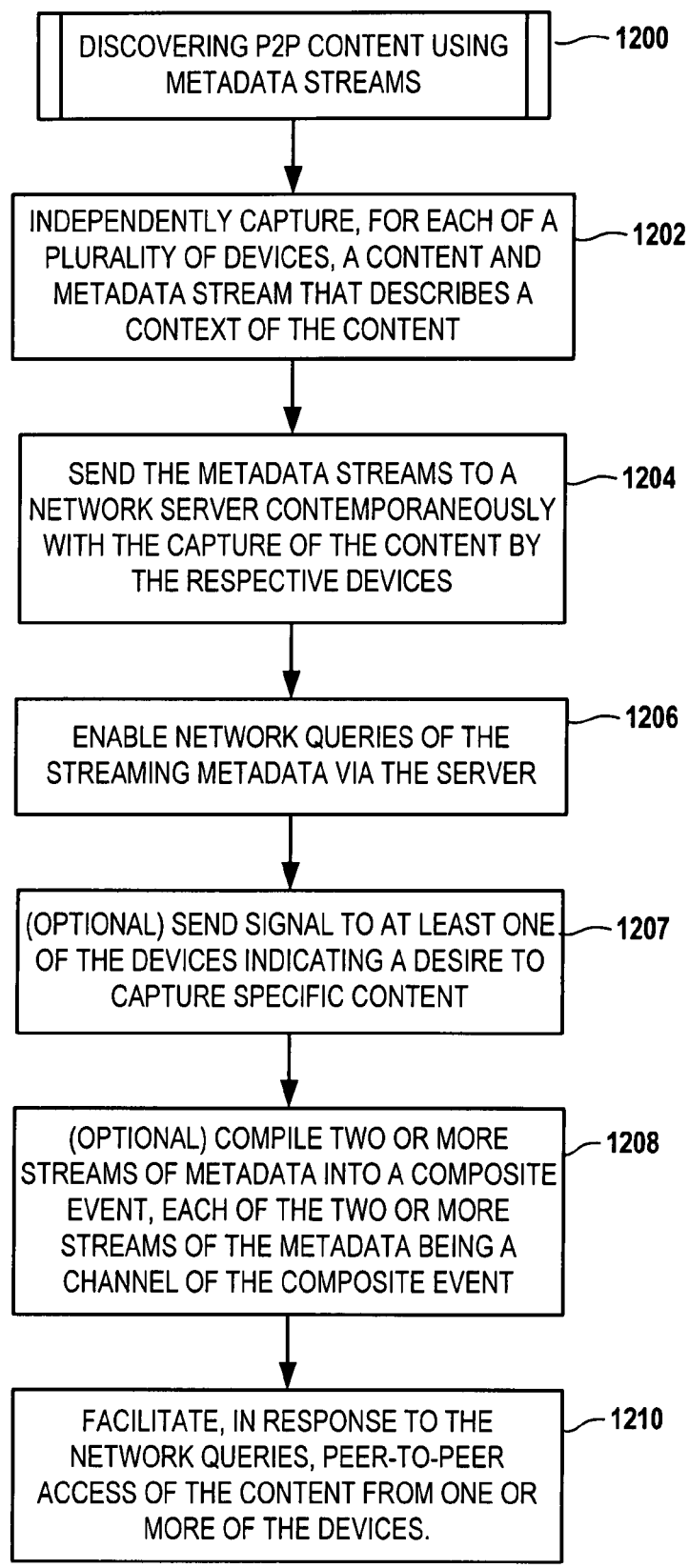
FIG. 12 is a flowchart discovering content using metadata streams according to an embodiment of the invention.

In reference now to FIG. 12, a flowchart illustrates a procedure 1200 for discovering P2P content using metadata streams according to an embodiment of the invention. The method involves capturing 1202, for each of a plurality of devices, a content and metadata stream that describes a context of the content. The devices capture 1202 the content independently, e.g., they do not rely on a central entity for coordination, nor do they necessarily need to know of the existence of each other. Typically, at least some of the metadata is produced by the device that captures the content, although other devices may also contribute to the metadata stream. In some variations, one or more of the devices may detect data from a proximate device, and captures the data of the proximate device. The metadata streams are sent 1204 to a network server contemporaneously with the capture of the content by the respective devices. Network queries of the streaming metadata is enabled 1206 via the server, and such queries may be based on location, time, and popularity of the content associated with the metadata, etc. The queries 1206 may be provided by way of network push, pull, structured language queries, search terms, numerical searches, etc.

The method may optionally involve compiling 1208 two or more streams of metadata into a composite event, wherein each of the two or more streams of the metadata comprises a channel of the composite event. The two or more streams may be automatically selected based on predetermined criteria, such as additional metadata that describes a measured characteristic of the content, a popularity of a metadata stream, etc. The two or more streams may be selected for compilation by a human director, who acts independently of the devices and of viewers of the content. The human director may be provided additional metadata from the source devices that describes a composition of the respective content (e.g., a low bandwidth representation of the content). Where the data is compiled into a composite event, the viewers may be provided with selection and/or modification of the channels associated with the composite event.

In another variation, a signal may be sent 1207 via the metadata repository to at least one of the plurality of devices. The signal indicates a desire to capture specific content, and where the at least one device captures the specific content in response to the signal. In response to the network queries and/or signals, peer-to-peer access of the content is facilitated 1210 from one or more of the devices. Where the metadata is formed into a composite event, the metadata that describes the composite event may be provided in response to the network query.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A method comprising:
receiving metadata streams that describe a context of content captured via independent mobile devices, wherein the metadata streams are generated by metadata sensors of the mobile devices that are separate from sensors that capture the content;
sending the metadata streams to a metadata repository contemporaneously with the capture of the content by the respective mobile devices;
enabling network queries of the streaming metadata via the metadata repository, wherein the queries operate on the context described by the streaming metadata; and
facilitating, in response to the network queries, peer-to-peer access of the content from one or more of the mobile devices.

2. The method of claim 1, wherein enabling network queries of the streaming metadata via the metadata repository comprises:
compiling two or more of the metadata streams into a composite event, wherein each of the two or more streams of the metadata comprises a channel of the composite event; and
providing metadata that describes the composite event in response to the network query.

3. The method of claim 2, further comprising:
automatically selecting the two or more streams for compilation via a computing arrangement based on predetermined criteria of the metadata streams.

4. The method of claim 3, wherein the predetermined criteria comprises a popularity of at least one of the metadata stream and the content associated with the metadata stream.

5. The method of claim 2, further comprising:
facilitating selecting the two or more streams for compilation via a human director who is independent of the devices and of viewers of the content.

6. The method of claim 5, further comprising:
providing to the human director additional metadata gathered from the mobile devices that generated the two or more streams, wherein the additional metadata describes a composition of the respective content captured by the devices.

7. The method of claim 6, wherein the additional metadata comprises a low bandwidth representation of the respective content.

8. The method of claim 2, further comprising:
facilitating user selection of the channels by a user who views the content associated with the composite event via the peer-to-peer access.

9. The method of claim 2, further comprising:
facilitating user access to the two or more streams of metadata; and
facilitating user modification of the composite event based on user access to the two or more streams of metadata.

10. The method of claim 1, wherein enabling network queries of the streaming metadata via the metadata repository comprises enabling queries based on location, time, and popularity of the content associated with the metadata.

11. The method of claim 1, further comprising:
sending a signal to at least one of the plurality of mobile devices, wherein the signal indicates a desire to capture specific content, and wherein the at least one device captures the specific content in response to the signal.

12. The method of claim 1, wherein the metadata stream comprises context data received by at least one of the mobile devices from a proximate device and the metadata streams are sent at intervals based, at least in part, on the content.

13. An apparatus comprising:
at least one processor; and
at least one memory including computer program code for one or more programs,
the at least one memory and the computer program code configured to, with the at least one processor, cause the apparatus to perform at least the following:
capture content independently of other mobile devices via a sensor coupled to the apparatus;

generate a metadata stream that describes a context of the content based on readings of a metadata sensor coupled to the apparatus, wherein the metadata sensor is separate from the sensor that captures content;

send the metadata stream to a metadata repository contemporaneously with the capture of the content, wherein the metadata repository processes other metadata streams that describe sensed context data of other content from the other mobile devices; and facilitate, in response to network queries processed via the metadata repository, peer-to-peer access of the content from the apparatus, wherein the queries operate on the context described by the metadata streams.

14. The apparatus of claim 13, wherein the apparatus is further caused, at least in part, to:

send, a network query based on the generated metadata stream;

access, via the metadata repository and in response to the query, other metadata contributed by the other mobile devices, wherein the other metadata is related to the other metadata streams; and access content of the mobile devices that are associated with the other metadata.

15. The apparatus of claim 13, wherein the apparatus is further caused, at least in part, to:

detect data from one or more proximate devices and generate at least part of the metadata stream from the data of the proximate devices.

16. A non-transitory computer-readable storage medium carrying one or more sequences of one or more instructions which, when executed by one or more processors, cause an apparatus to at least perform the following steps:

capturing content via a sensor of the device independently of other mobile devices;

generating a metadata stream that describes a context of the content based on readings of a metadata sensor coupled to the mobile device, wherein the metadata sensor is separate from the sensor that captures content;

sending the metadata stream to a metadata repository contemporaneously with the capture of the content, wherein the metadata repository processes other metadata streams that describe sensed context data of other content from the other mobile devices; and facilitating, in response to network queries processed via the metadata repository, peer-to-peer access of the content from the mobile device, wherein the queries operate on the context described by the metadata streams.

17. An apparatus comprising:

at least one processor; and at least one memory including computer program code for one or more programs, the at least one memory and the computer program code configured to, with the at least one processor, cause the apparatus to perform at least the following:

receive metadata streams from independent mobile devices, wherein the mobile devices generate the metadata streams contemporaneously with the capture of content by the respective mobile devices, and wherein the metadata streams include a context of the content generated by metadata sensors of the mobile devices that are separate from the respective sensors that capture the content;

send the metadata streams to a metadata repository;

receive network queries from a content consumer device wherein the queries operate on the context of the metadata streams;

send a response to the query based on the metadata contained in the metadata repository, wherein the response contains data that facilitates peer-to-peer access of the content by the content consumer device from the mobile devices.

18. The apparatus of claim 17, wherein the apparatus is further caused, at least in part, to:

compile two or more streams of metadata into a composite event, wherein each of the two or more streams of the metadata comprises a channel of the composite event; and provide the composite event in response to the network query.

19. The apparatus of claim 18, wherein the apparatus is further caused, at least in part, to:

facilitate selecting the two or more streams for compilation via a human director who is independent of the mobile devices and the content consumer device.

20. A non-transitory computer-readable storage medium carrying one or more sequences of one or more instructions which, when executed by one or more processors, cause an apparatus to at least perform the following steps:

receiving metadata streams from independent mobile devices, wherein the mobile devices generate the metadata contemporaneously with the capture of the content by the respective mobile devices, and wherein the metadata streams include a context of the content generated by metadata sensors of the mobile devices that are separate from the respective sensors that capture the content;

sending the metadata streams to a metadata repository;

receiving network queries from a content consumer devices wherein the queries operate on the context of the metadata streams; and sending a response to the query based on the metadata contained in the metadata repository, wherein the response contains data that facilitates peer-to-peer access of the content by the content consumer device from the mobile devices.

21. The non-transitory computer-readable storage medium of claim 20, wherein the apparatus is caused, at least in part, to further perform:

compiling two or more streams of metadata into a composite event, wherein each of the two or more streams of the metadata comprises a channel of the composite event; and providing the composite event in response to the network query.

22. The method of claim 1, wherein the context comprises at least one of a time, location, and device orientation associated with the creation of the content.

23. The apparatus of claim 13, wherein the context comprises at least one of a time, location, and apparatus orientation associated with the creation of the content.

* * * * *